(12) United States Patent
Puthillath et al.

(10) Patent No.: US 12,089,760 B2
(45) Date of Patent: Sep. 17, 2024

(54) FLOOR MAT WITH HIDDEN BASE COMPONENT

(71) Applicant: Milliken & Company, Spartanburg, SC (US)

(72) Inventors: Padmakumar Puthillath, Greer, SC (US); Franklin S. Love, Columbus, NC (US); Dale S. Kitchen, Boiling Springs, SC (US); Ty G. Dawson, Spartanburg, SC (US); Barry R. McClure, Campobello, SC (US); Michael D. Bishop, Chesnee, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 17/527,216

(22) Filed: Nov. 16, 2021

(65) Prior Publication Data

US 2022/0071427 A1    Mar. 10, 2022

Related U.S. Application Data

(60) Division of application No. 16/109,930, filed on Aug. 23, 2018, which is a continuation of application No. 15/648,706, filed on Jul. 13, 2017, now abandoned.
(Continued)

(51) Int. Cl.
*A47G 27/02* (2006.01)
*A47G 27/04* (2006.01)
(Continued)

(52) U.S. Cl.
CPC ......... *A47G 27/02* (2013.01); *A47G 27/0206* (2013.01); *A47G 27/0243* (2013.01);
(Continued)

(58) Field of Classification Search
CPC ................ A47G 27/02; A47G 27/0206; A47G 27/0406; A47L 23/266; D06N 7/0068;
(Continued)

(56) References Cited

U.S. PATENT DOCUMENTS

| | | |
|---|---|---|
| 2,693,654 A | 11/1954 | Clark |
| 3,126,924 A | 3/1964 | Kirkpatrick |

(Continued)

FOREIGN PATENT DOCUMENTS

| | | |
|---|---|---|
| AU | 198941219 | 3/1991 |
| AU | 682899 | 10/1997 |

(Continued)

OTHER PUBLICATIONS

D2 Milliken™ Convertible Flooring with ADAPTEX™ Active Surface Technology, 2 pages. millikenfloors.com/d2. Jul. 2018.
(Continued)

*Primary Examiner* — Cheryl Juska
(74) *Attorney, Agent, or Firm* — Brenda D. Amidon

(57) ABSTRACT

This invention relates to a washable multi-component magnetic floor mat with a hidden base component. The floor mat contains a textile component and a base component. The textile component and the base component are attached to one another by magnetic attraction. The magnetic attraction is provided by incorporation of magnetic particles in both the textile and base components. The textile component is designed to be soiled, washed, and re-used, thereby providing ideal end-use applications in areas such as building entryways. The present invention eliminates the need to wash the base component of the floor mat which results in environmental, cost and labor conservation. Alignment and deployment of the textile component with the base component in an efficient manner is also described herein.

1 Claim, 18 Drawing Sheets

Related U.S. Application Data

(60) Provisional application No. 62/378,739, filed on Aug. 24, 2016.

(51) Int. Cl.

| | | |
|---|---|---|
| *A47L 23/26* | (2006.01) | |
| *B32B 3/04* | (2006.01) | |
| *B32B 3/06* | (2006.01) | |
| *B32B 7/06* | (2019.01) | |
| *B32B 25/02* | (2006.01) | |
| *B32B 25/04* | (2006.01) | |
| *B32B 25/10* | (2006.01) | |
| *B32B 25/14* | (2006.01) | |
| *D05C 17/02* | (2006.01) | |
| *D06N 7/00* | (2006.01) | |
| *B32B 5/02* | (2006.01) | |
| *B32B 7/12* | (2006.01) | |
| *B32B 38/00* | (2006.01) | |
| *B60N 3/04* | (2006.01) | |
| *H01F 7/00* | (2006.01) | |
| *H01F 7/126* | (2006.01) | |

(52) U.S. Cl.
CPC .......... *A47G 27/04* (2013.01); *A47G 27/0406* (2013.01); *A47G 27/0418* (2013.01); *A47L 23/266* (2013.01); *B32B 3/04* (2013.01); *B32B 3/06* (2013.01); *B32B 7/06* (2013.01); *B32B 25/02* (2013.01); *B32B 25/042* (2013.01); *B32B 25/10* (2013.01); *B32B 25/14* (2013.01); *D05C 17/02* (2013.01); *D06N 7/0068* (2013.01); *D06N 7/0071* (2013.01); *D06N 7/0094* (2013.01); *A47G 27/0293* (2013.01); *B32B 5/02* (2013.01); *B32B 7/12* (2013.01); *B32B 2038/0076* (2013.01); *B32B 2264/102* (2013.01); *B32B 2264/105* (2013.01); *B32B 2307/00* (2013.01); *B32B 2307/208* (2013.01); *B32B 2471/04* (2013.01); *B60N 3/046* (2013.01); *D06N 2205/20* (2013.01); *D06N 2209/045* (2013.01); *D06N 2211/066* (2013.01); *D06N 2213/066* (2013.01); *D06N 2213/068* (2013.01); *H01F 7/00* (2013.01); *H01F 7/126* (2013.01); *Y10T 428/23979* (2015.04)

(58) Field of Classification Search
CPC ........... D06N 7/0071; D06N 2213/068; D06N 2205/20; D06N 2209/04; D06N 2209/045; Y10T 428/23979; B32B 2471/04; B32B 2307/208; B32B 7/06; B32B 25/02; B32B 25/042
See application file for complete search history.

(56) References Cited

U.S. PATENT DOCUMENTS

| | | |
|---|---|---|
| 3,305,428 A | 2/1967 | Moore |
| 3,696,459 A | 10/1972 | Kucera |
| 4,010,301 A | 3/1977 | Anderson |
| 4,070,505 A | 1/1978 | Baril, Jr. |
| 4,187,332 A | 2/1980 | Fouche, Jr. |
| 4,353,944 A | 10/1982 | Tarui |
| 4,361,925 A | 12/1982 | Yamamoto |
| 4,397,900 A | 8/1983 | Higgins |
| 4,405,674 A | 9/1983 | Kyle |
| 4,421,809 A | 12/1983 | Bish |
| 4,454,183 A | 6/1984 | Wollman |
| 4,515,850 A | 5/1985 | Ishino |
| 4,578,132 A | 3/1986 | Van Uden |
| 4,595,617 A | 6/1986 | Bogdany |
| 4,678,533 A | 7/1987 | Barlett |
| 4,769,895 A | 9/1988 | Parkins |
| 5,035,017 A | 7/1991 | Komuro |
| 5,077,870 A | 1/1992 | Melbye |
| 5,096,764 A | 3/1992 | Terry |
| 5,161,272 A | 11/1992 | Yamaguchi |
| 5,198,278 A | 3/1993 | Sumimoto |
| 5,524,317 A | 6/1996 | Nagahama |
| 5,607,635 A | 3/1997 | Melbye |
| 5,752,357 A | 5/1998 | Piller |
| 5,811,165 A | 9/1998 | Andreen |
| 5,845,735 A | 12/1998 | Muller |
| 5,925,434 A | 7/1999 | Phillips |
| 6,022,619 A | 2/2000 | Kuhn |
| 6,093,469 A | 7/2000 | Callas |
| 6,219,876 B1 | 4/2001 | Blum |
| 6,233,776 B1 | 5/2001 | Blum |
| 6,250,001 B1 | 6/2001 | Gillespie |
| 6,475,594 B2 | 11/2002 | Johnston |
| 6,694,689 B1 | 2/2004 | Scott |
| 6,821,573 B1 | 11/2004 | Paping |
| 6,861,118 B2 | 3/2005 | Kobayashi |
| 6,881,450 B1 | 4/2005 | Texier |
| 6,913,810 B2 | 7/2005 | Wang |
| 7,001,645 B1 | 2/2006 | Texier |
| 7,022,394 B2 | 4/2006 | Fujisawa |
| 7,096,642 B2 | 8/2006 | Higgins |
| 7,125,595 B2 | 10/2006 | Kobayashi |
| 7,188,396 B2 | 3/2007 | Melbye |
| 7,338,698 B1 | 3/2008 | Bieser |
| 7,416,771 B2 | 8/2008 | Bailey |
| 7,504,131 B2 | 3/2009 | Deleon |
| 7,648,751 B2 | 1/2010 | Janzen |
| 7,678,159 B1 | 3/2010 | Weiner |
| 7,846,214 B1 | 12/2010 | Weiner |
| 7,854,021 B2 | 12/2010 | Compton |
| 7,993,717 B2 | 8/2011 | O'Connor |
| 8,056,295 B2 | 11/2011 | Cappelle |
| 8,298,642 B2 | 10/2012 | Yuan |
| 8,309,198 B2 | 11/2012 | Bell |
| 8,656,682 B2 | 2/2014 | Williamson |
| 9,028,951 B2 | 5/2015 | Boudouris |
| 2002/0023308 A1 | 2/2002 | Blum |
| 2002/0034606 A1 | 3/2002 | Miller |
| 2002/0092110 A1 | 7/2002 | Blum |
| 2003/0161990 A1 | 8/2003 | Higgins |
| 2003/0165657 A1 | 9/2003 | Rockwell |
| 2003/0180499 A1 | 9/2003 | Kobayashi |
| 2004/0013849 A1 | 1/2004 | Kobayashi |
| 2004/0022994 A1 | 2/2004 | Higgins |
| 2004/0053002 A1 | 3/2004 | Kobayashi |
| 2004/0197522 A1 | 10/2004 | Reisdorf |
| 2005/0025930 A1 | 2/2005 | Hamrick |
| 2005/0064242 A1 | 3/2005 | Schneider |
| 2005/0079316 A1 | 4/2005 | Kobayashi |
| 2005/0079317 A1 | 4/2005 | Nord |
| 2005/0091936 A1 | 5/2005 | Galloway |
| 2006/0057328 A1 | 3/2006 | Pacione |
| 2006/0107480 A1 | 5/2006 | Degrandi |
| 2006/0147892 A1 | 7/2006 | Moore |
| 2007/0190287 A1 | 8/2007 | Seto |
| 2007/0202293 A1 | 8/2007 | Powell |
| 2007/0275207 A1 | 11/2007 | Higgins |
| 2007/0286982 A1 | 12/2007 | Higgins |
| 2008/0152902 A1 | 6/2008 | Adler |
| 2008/0190042 A1 | 8/2008 | Williamson |
| 2008/0261004 A1 | 10/2008 | Higgins |
| 2009/0029096 A1 | 1/2009 | Riddle |
| 2009/0029097 A1 | 1/2009 | Riddle |
| 2009/0110869 A1 | 4/2009 | Streeton |
| 2009/0191401 A1 | 7/2009 | Deetz |
| 2009/0304985 A1 | 12/2009 | Yuan |
| 2010/0247841 A1 | 9/2010 | Bell |
| 2011/0008567 A1 | 1/2011 | Weeks |
| 2011/0054074 A1 | 3/2011 | Jonschker |
| 2011/0123758 A1 | 5/2011 | Pollaud |
| 2011/0195219 A1 | 8/2011 | Bell |
| 2011/0201241 A1 | 8/2011 | Rubino |
| 2011/0229692 A1 | 9/2011 | Bozouklian |

(56) References Cited

U.S. PATENT DOCUMENTS

| | | |
|---|---|---|
| 2011/0318523 A1 | 12/2011 | Todd |
| 2013/0056672 A1 | 3/2013 | Johnston |
| 2013/0099438 A1 | 4/2013 | Mann |
| 2013/0198990 A1 | 8/2013 | Hawkins |
| 2014/0137377 A1 | 5/2014 | Cheng |
| 2014/0141198 A1 | 5/2014 | Teran |
| 2014/0223684 A1 | 8/2014 | Hawkins |
| 2015/0017376 A1 | 1/2015 | Smith |
| 2015/0061173 A1 | 3/2015 | Murata |
| 2015/0140341 A1 | 5/2015 | Robinson |
| 2016/0037949 A1 | 2/2016 | Dawson |
| 2016/0257097 A1 | 9/2016 | Bing |
| 2016/0319553 A1 | 11/2016 | Lautzenhiser |
| 2016/0375673 A1 | 12/2016 | Lautzenhiser |
| 2020/0024799 A1 | 1/2020 | Bing |

FOREIGN PATENT DOCUMENTS

| | | |
|---|---|---|
| AU | 2011100493 A4 | 7/2011 |
| CH | 526291 A | 8/1972 |
| CN | 1034482 A | 8/1989 |
| CN | 2183017 Y | 11/1994 |
| CN | 1107028 A | 8/1995 |
| CN | 200942000 Y | 9/2007 |
| CN | 101078182 | 11/2007 |
| CN | 201958557 U | 9/2011 |
| CN | 103507305 | 1/2014 |
| DE | 2413183 | 10/1974 |
| DE | 199211303 | 12/1992 |
| DE | 19956319 | 6/2001 |
| DE | 20300915 | 5/2003 |
| DE | 10084239 | 8/2007 |
| DE | 102010023402 A1 | 6/2011 |
| DE | 102010020922 | 11/2011 |
| EP | 0541531 | 5/1993 |
| EP | 0609208 | 8/1994 |
| EP | 0653179 A1 | 5/1995 |
| EP | 0724660 B1 | 6/1997 |
| EP | 1091038 | 4/2001 |
| EP | 1788148 | 5/2007 |
| EP | 2602385 | 6/2013 |
| GB | 875807 | 8/1961 |
| GB | 2476133 | 6/2011 |
| JP | S58112835 | 7/1983 |
| JP | H06169875 | 6/1994 |
| JP | 2003180506 | 7/2003 |
| JP | 2003246037 | 9/2003 |
| JP | 2004052159 | 2/2004 |
| JP | 2004167819 | 6/2004 |
| JP | 2004353107 | 12/2004 |
| JP | 2005307377 | 11/2005 |
| JP | 2006296501 | 11/2006 |
| JP | 4170953 | 10/2008 |
| JP | 2008245825 | 10/2008 |
| JP | 2009035850 | 2/2009 |
| JP | 4545019 | 9/2010 |
| JP | 2011163114 | 8/2011 |
| JP | 2012165990 A | 9/2012 |
| JP | 2014129681 | 7/2014 |
| WO | 1987002564 | 5/1987 |
| WO | 2000016682 | 3/2000 |
| WO | 2001025514 | 4/2001 |
| WO | 2002065451 A1 | 8/2002 |
| WO | 2002072154 | 9/2002 |
| WO | 03106747 A2 | 12/2003 |
| WO | 2003106161 | 12/2003 |
| WO | 2004037063 A1 | 5/2004 |
| WO | 2004043539 | 5/2004 |
| WO | 2006103436 | 10/2006 |
| WO | 2006127873 A1 | 11/2006 |
| WO | 2016022643 | 2/2016 |

OTHER PUBLICATIONS

Database WPI, 0, Derwent World Patents Index, vol. 1994, No. 29, Database accession No. 1994-237617, XP002772922 & JPH06169875 A 19940621 (Duskin Co Ltd).
Patent Cooperation Treaty PCT International Search Report. Date of Mailing, Aug. 22, 2017. International Application No. PCT/US2017/033855. International Filing Date: May 22, 2017.
Patent Cooperation Treaty PCT International Search Report. Date of Mailing, Dec. 21, 2016. International Application No. PCT/US2016/043834. International Filing Date, Jul. 25, 2016. (5 pages).
Patent Cooperation Treaty PCT International Search Report. Date of Mailing, Oct. 11, 2017. International Application No. PCT/US2017/043226. International Filing Date: Jul. 21, 2017.
Stress Relaxation of tufted Carpets and Carpet Components. Phillips, Kristie Jo; issue date: Oct. 28, 2002. Located via: google Scholar. (154 pages).
Title: Billboard Mats URL: http://www.billboardmats.com/BillboardMats.html. Located Via: Google.com (1 page).
Title: MatMates™ Interchangeable Doormats URL: http://www.windsensations.com/Mat-Mates-s/202.htm. Located Via: Google.com (1 page).
Title: Nanosols and Textiles. Boris Mahltig, Torsten Textor. Copyright 2008 by World Scientific Publishing Co. Pte. Ltd.; pp. 109-126.
U.S. Appl. No. 14/735,184; Title: Interchangeable Logo Mat; Filing Date; Jun. 10, 2015 (20 pages).
YouTube video illustrating commercial product: https://Vimeo.com/user13097326/review/281991915/a9ab41530f.

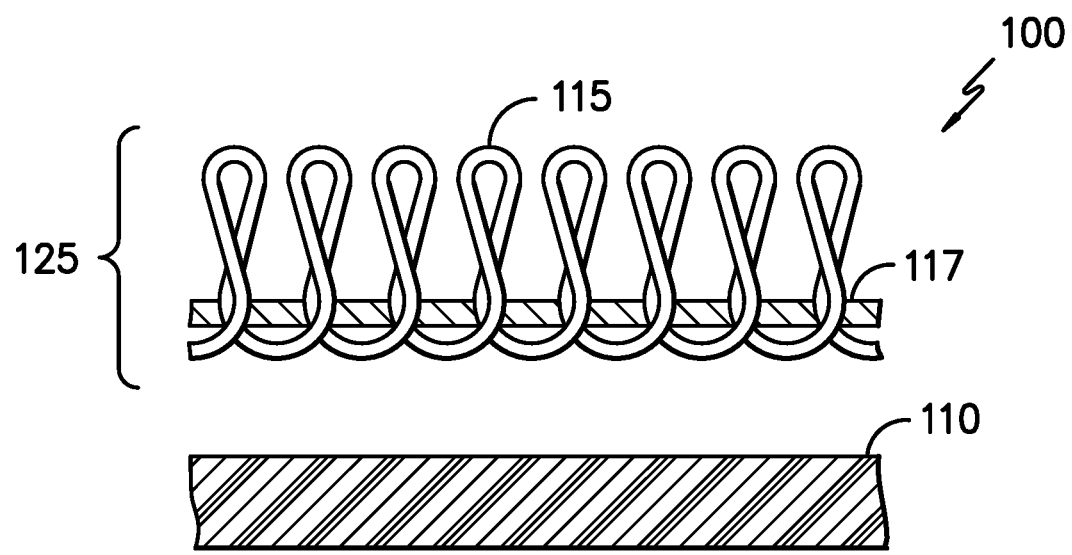
FIG. -1A-
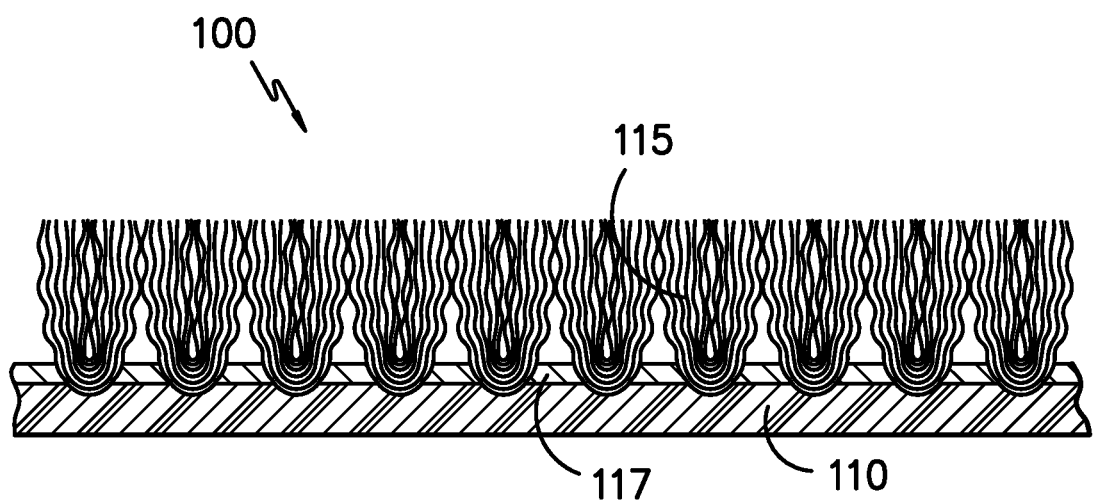
FIG. -1B-

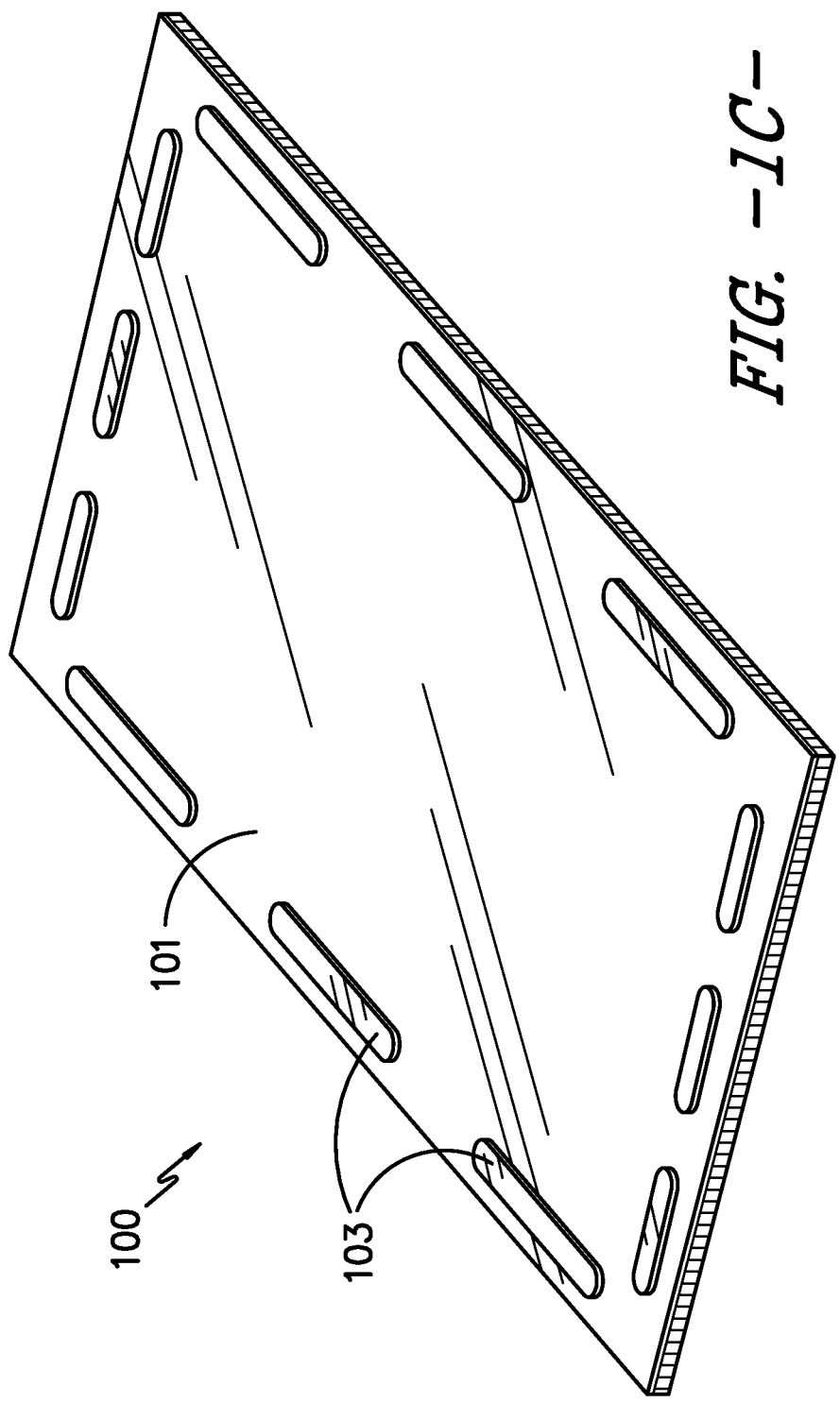
FIG. -1C-

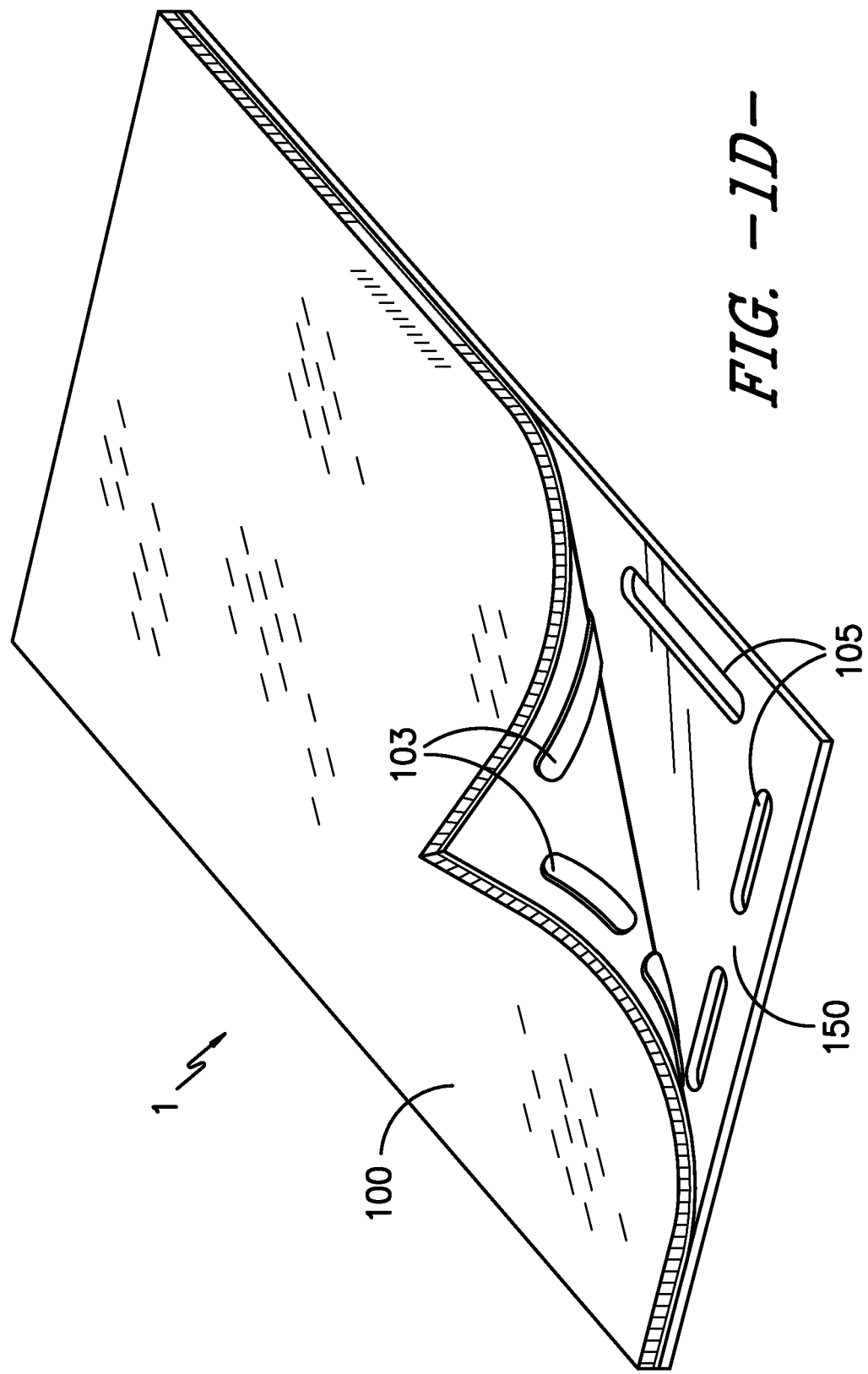

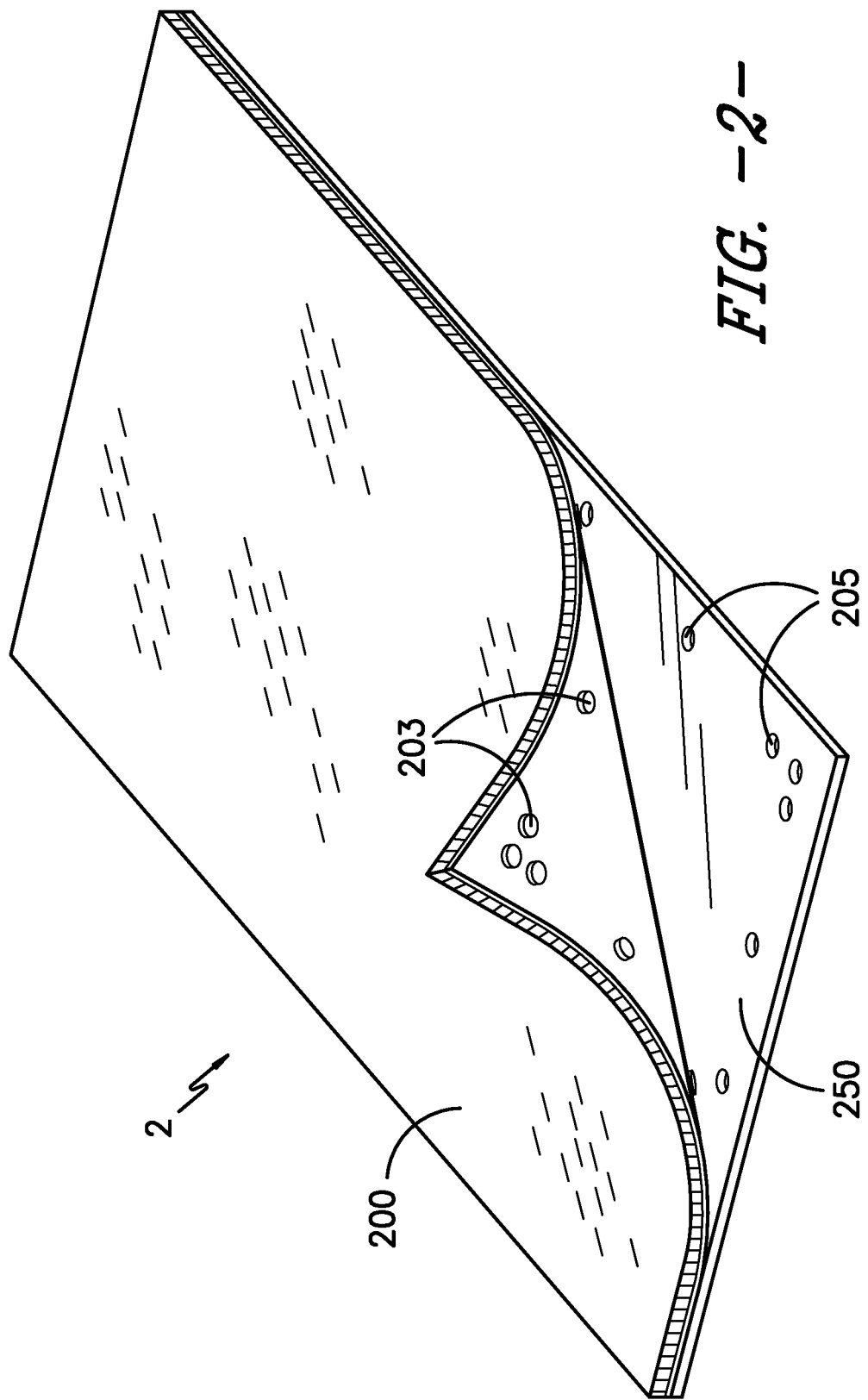
FIG. -2-

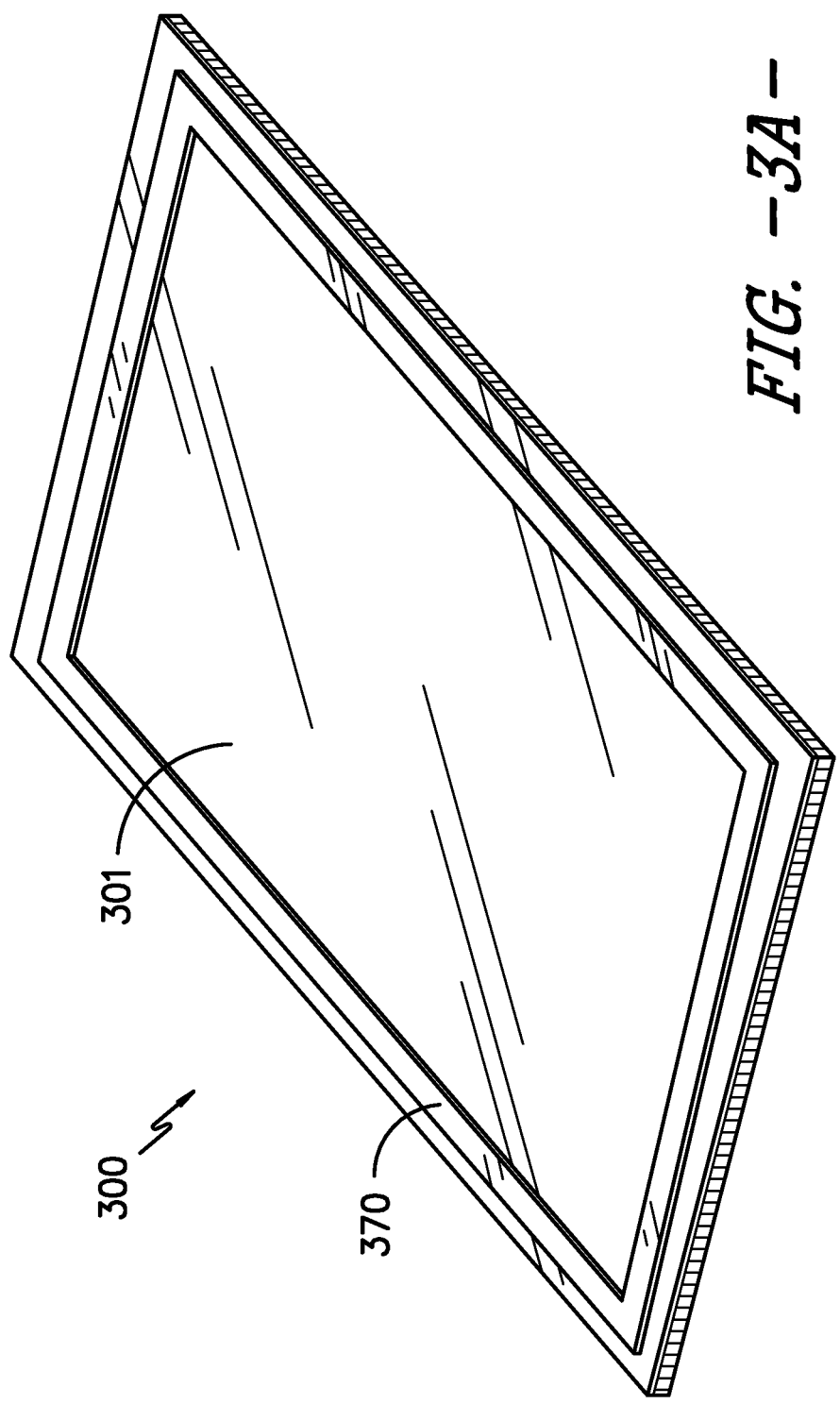
FIG. -3A-

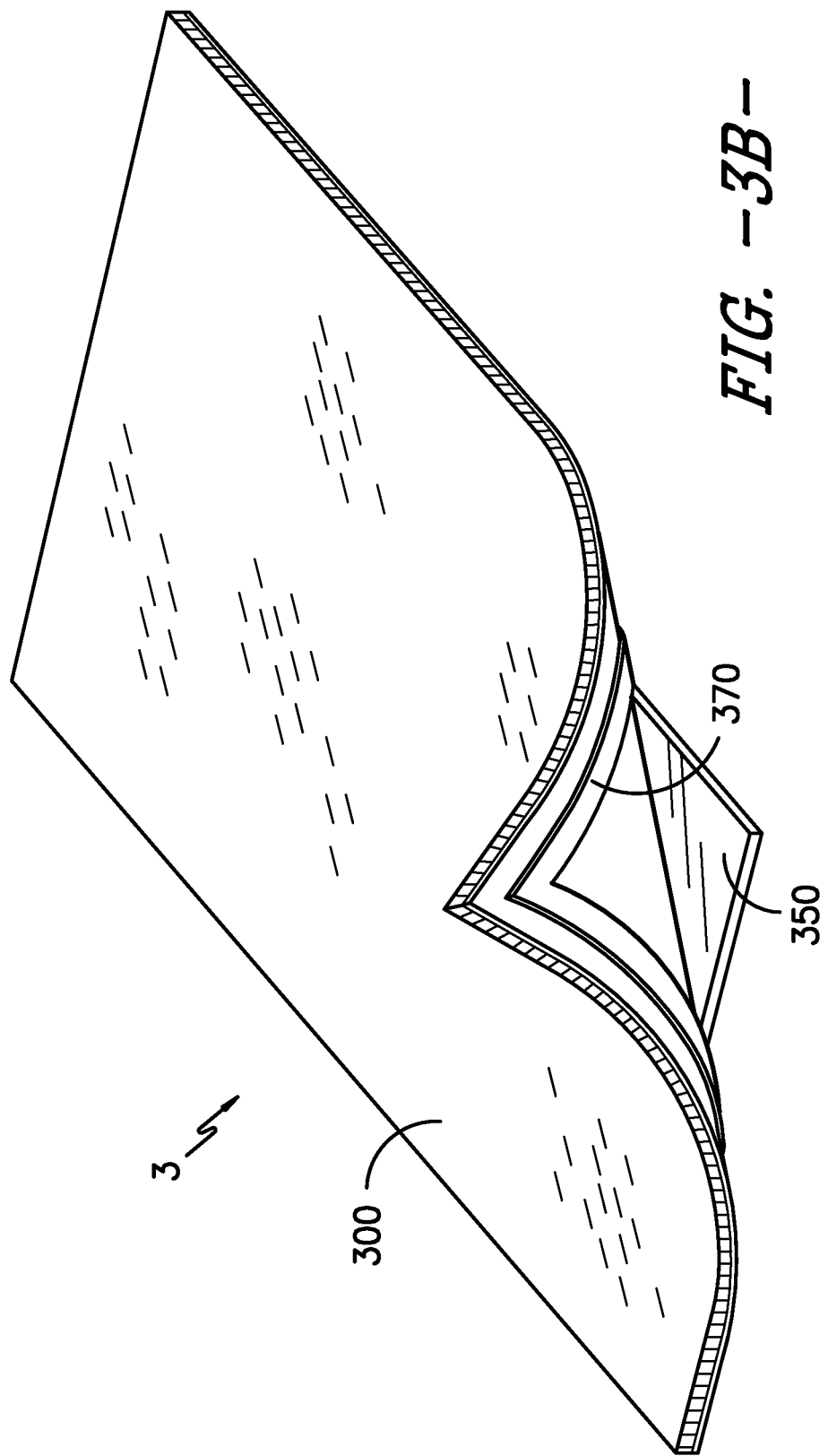
FIG. -3B-

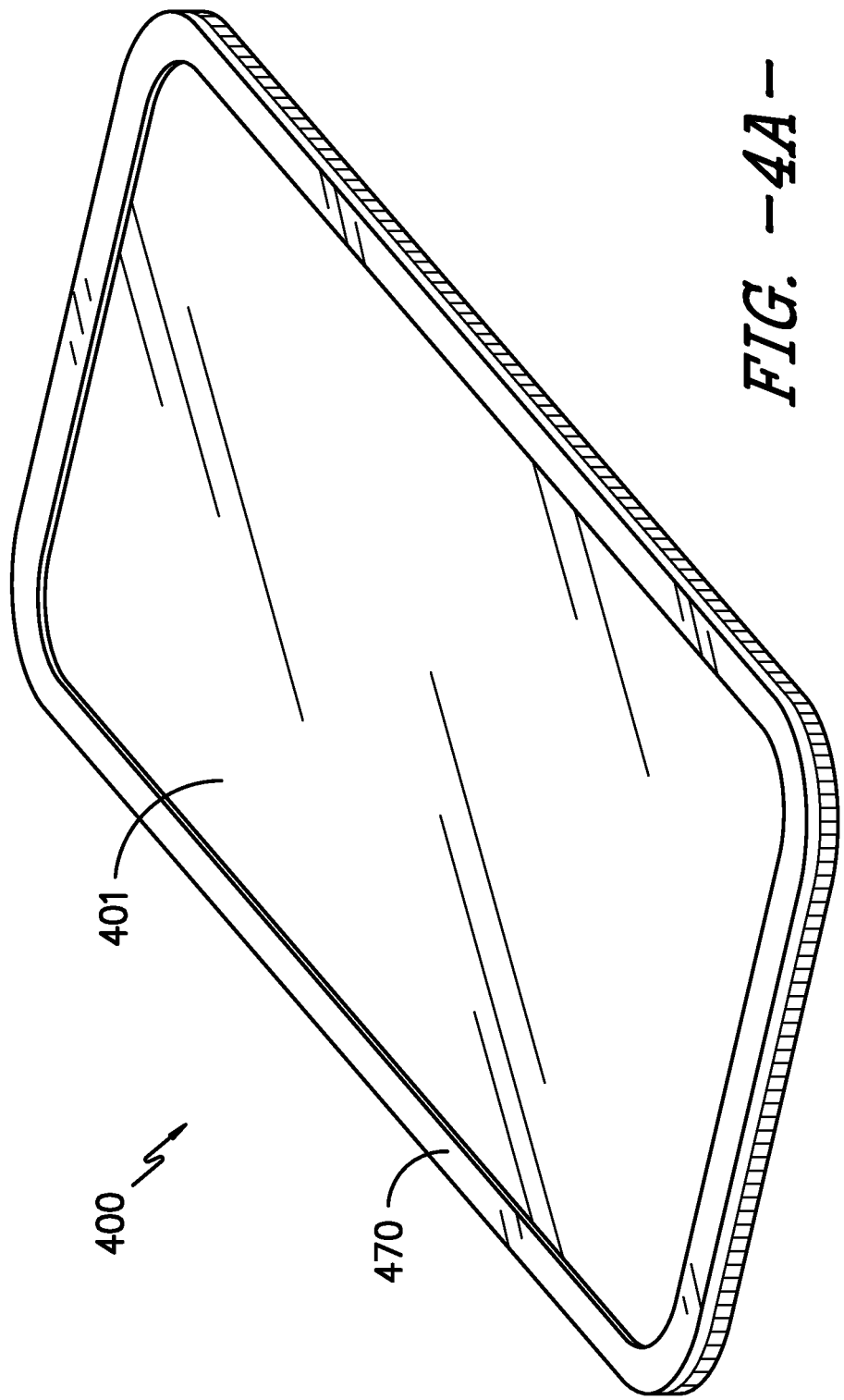
FIG. -4A-

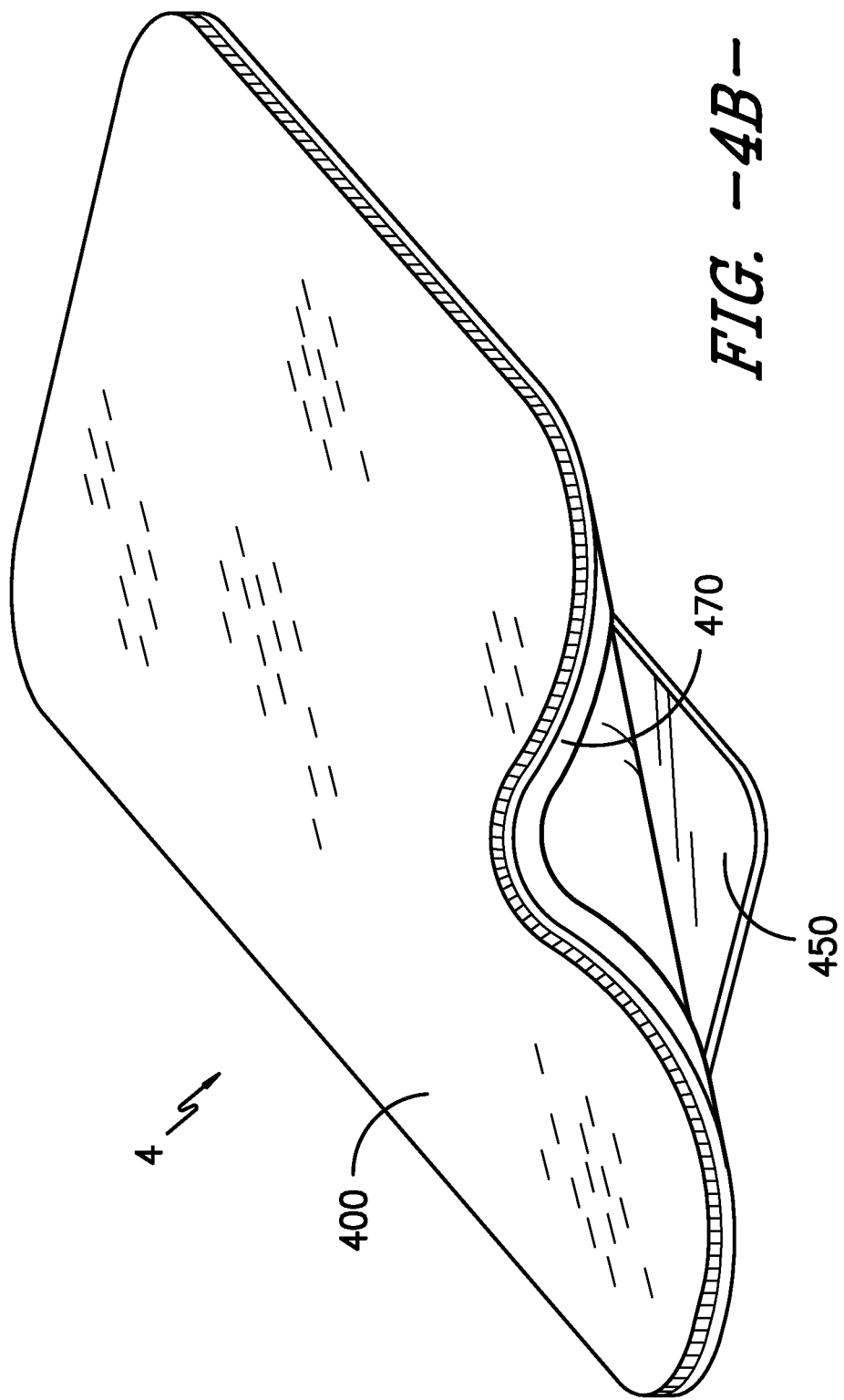
FIG. -4B-

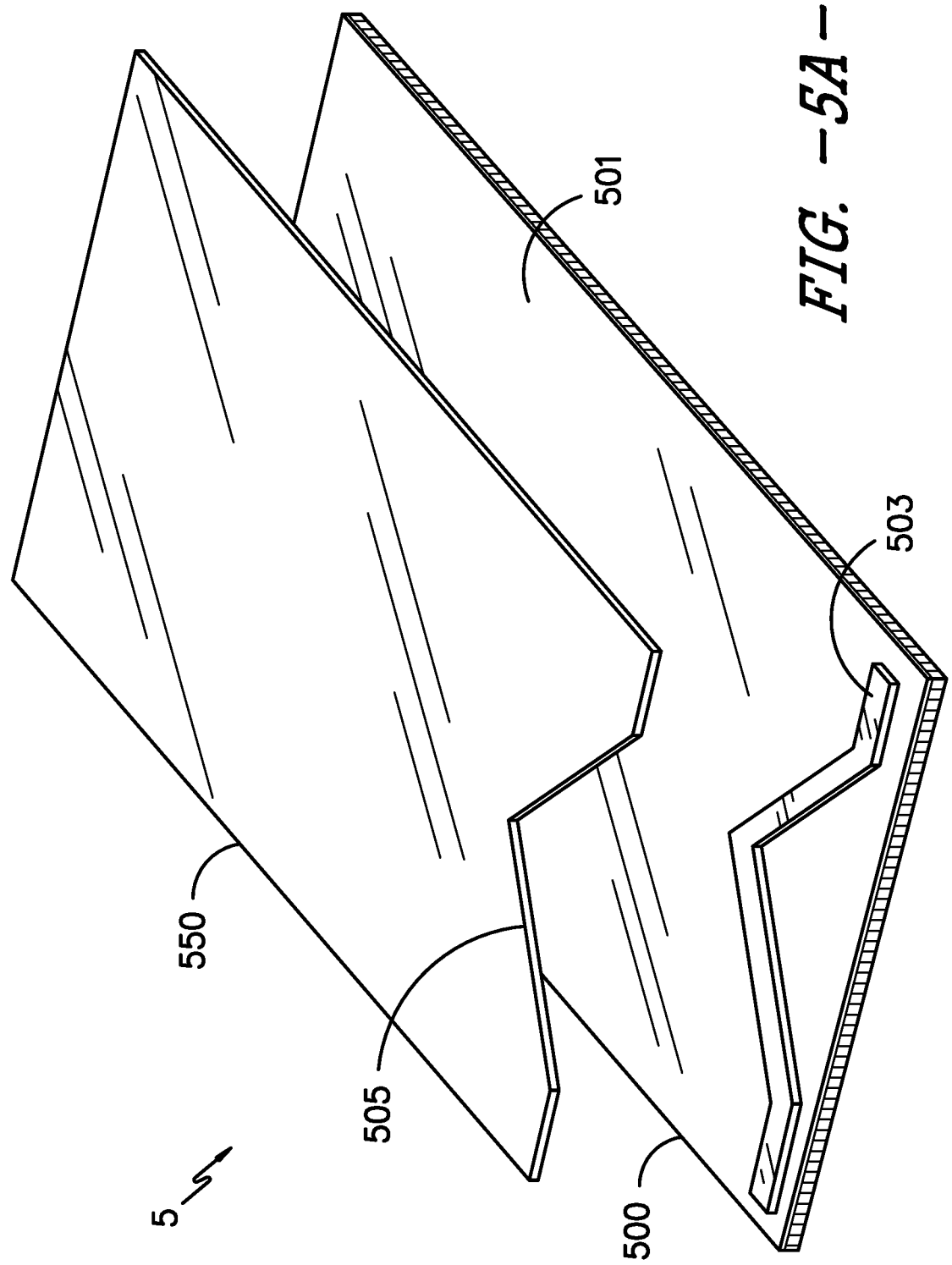
FIG. -5A-

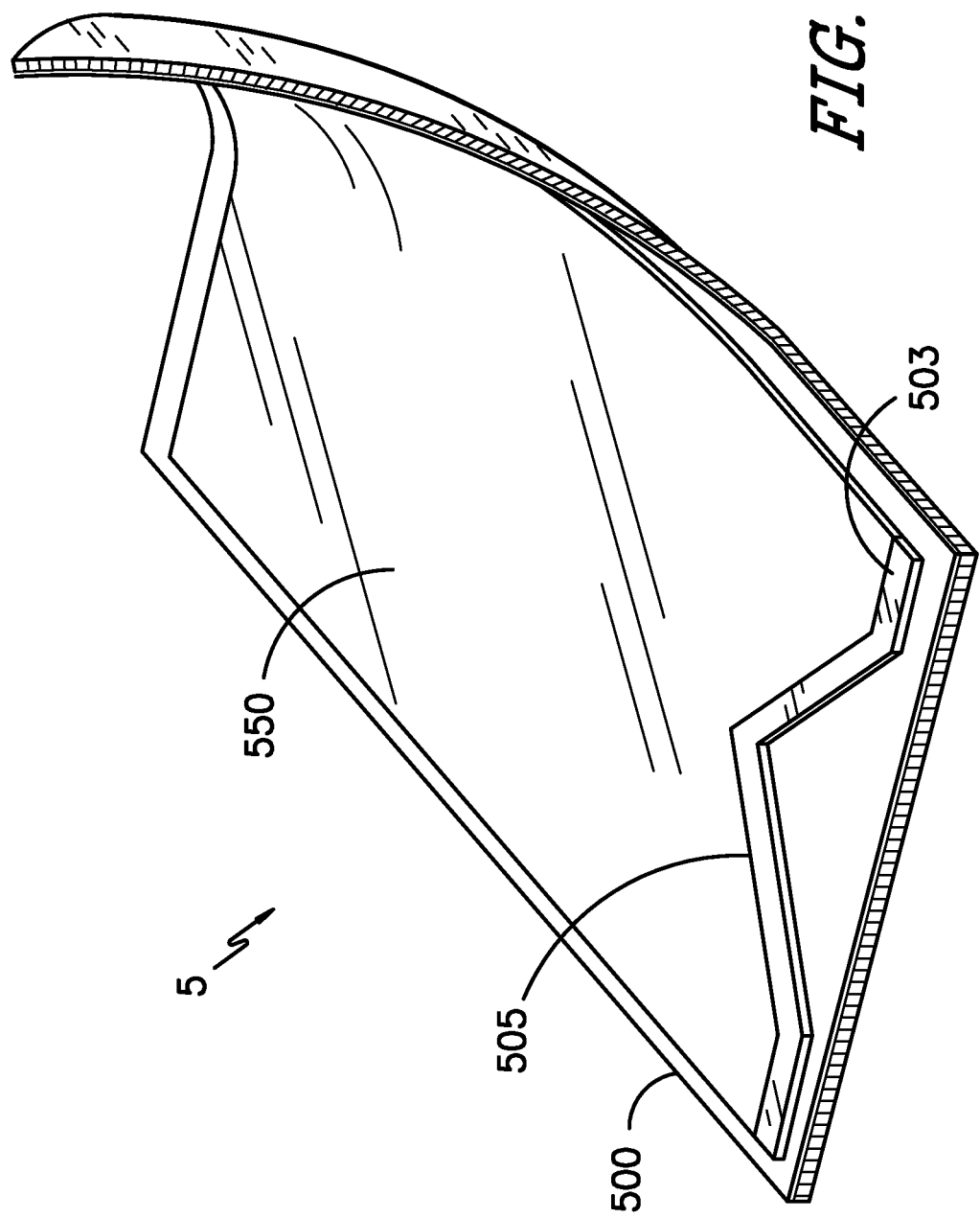
FIG. -5B-

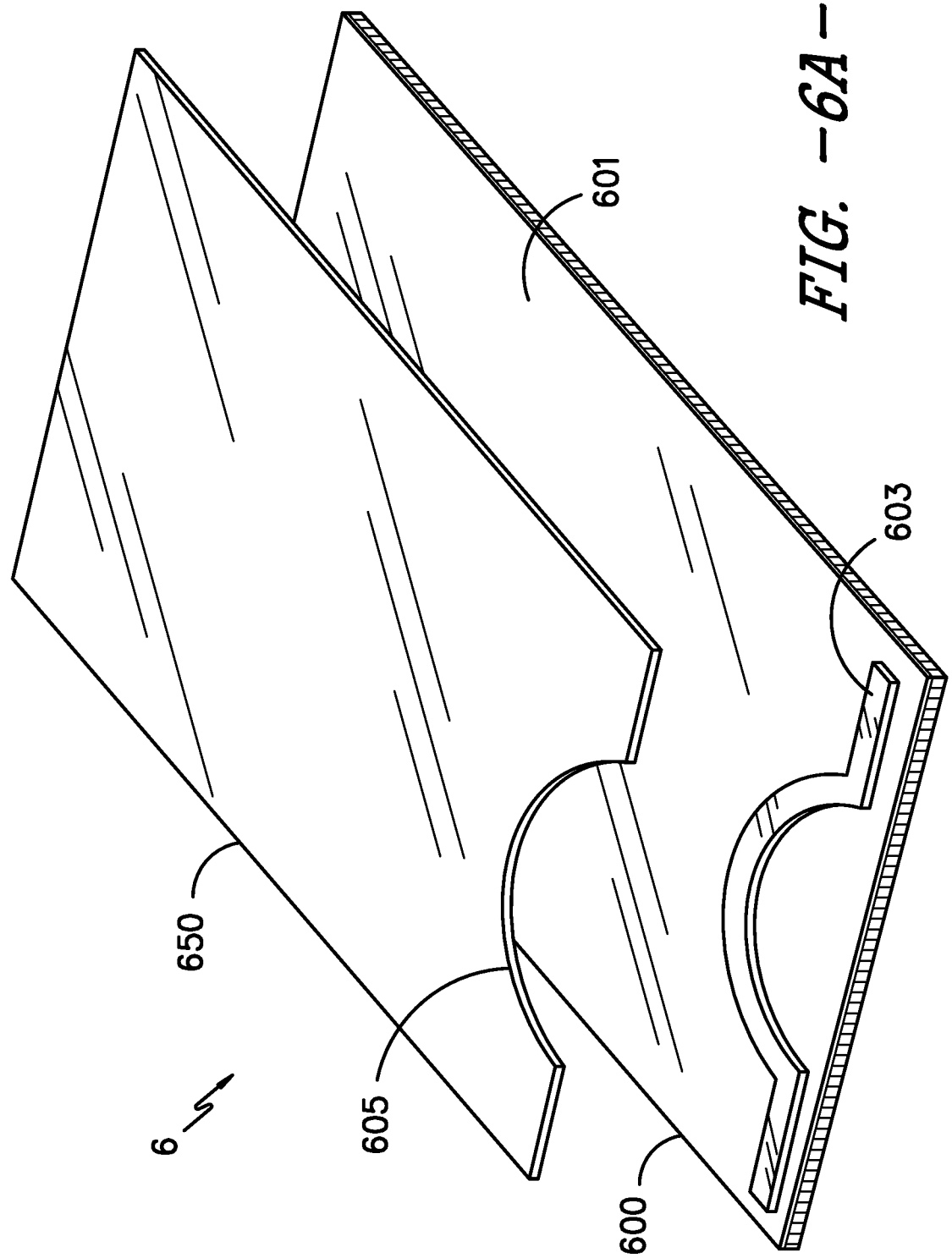
FIG. -6A-

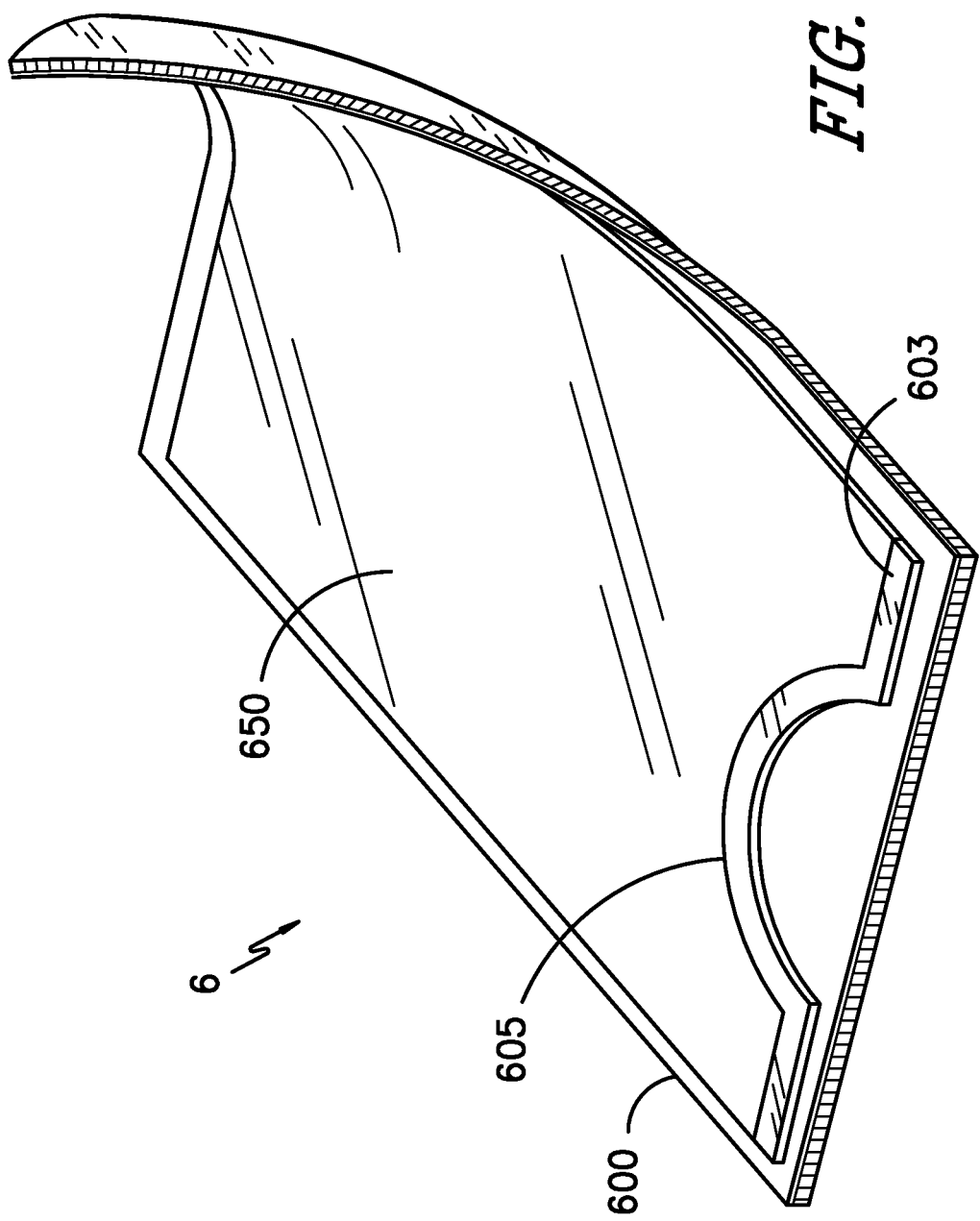
FIG. -6B-

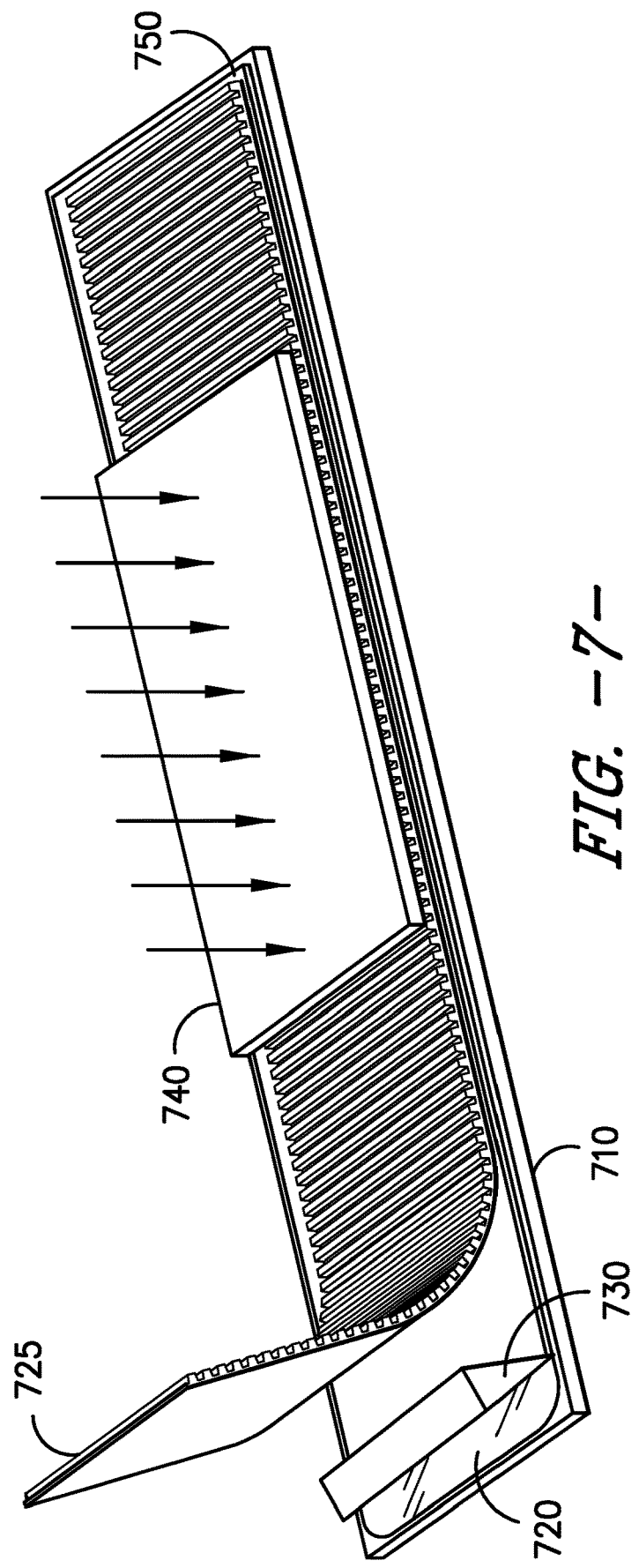
FIG. -7-

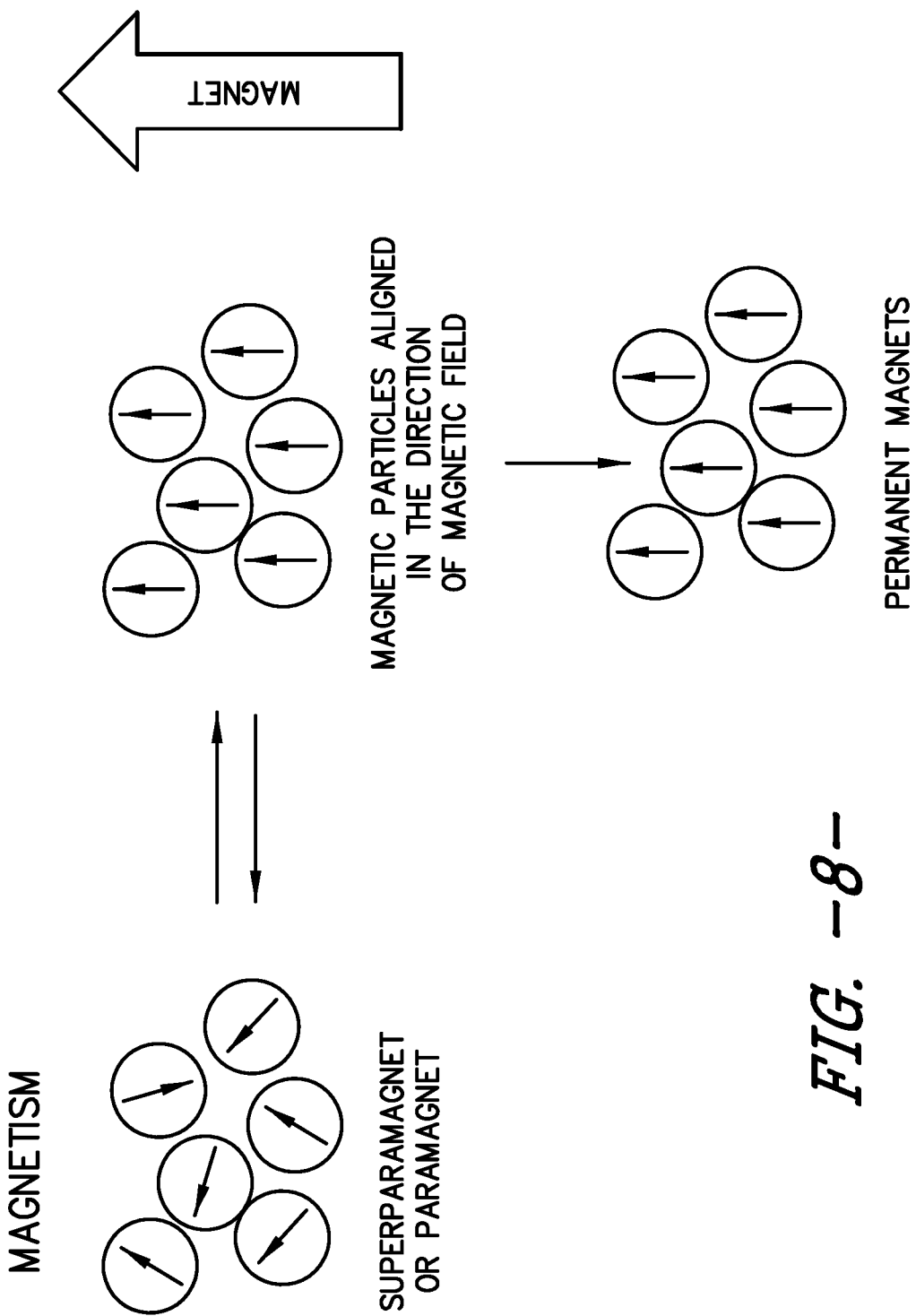
FIG. -8-

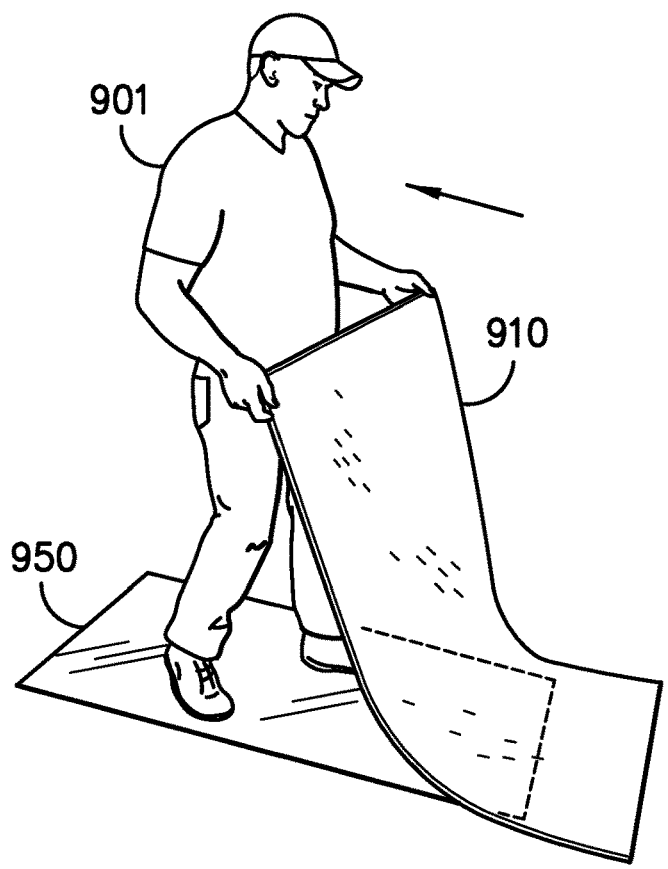
FIG. -9A-
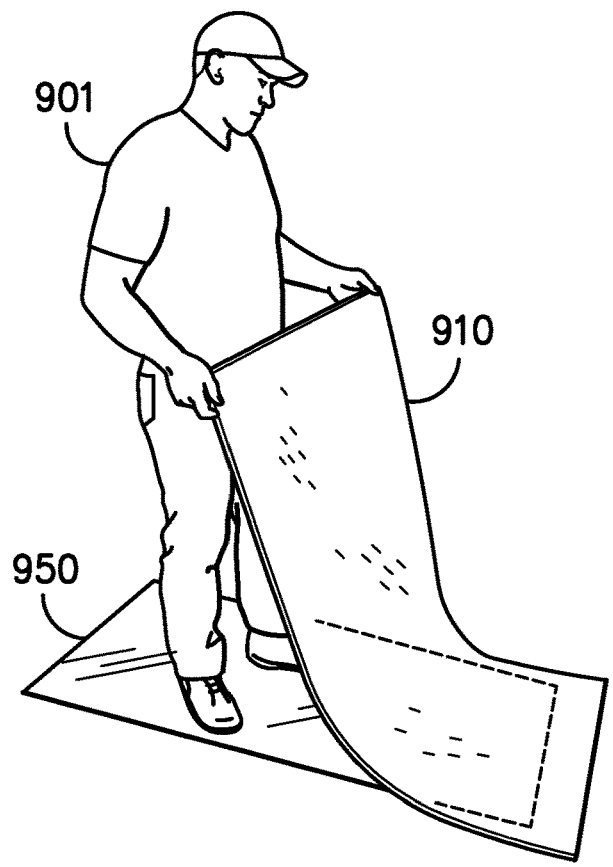
FIG. -9B-

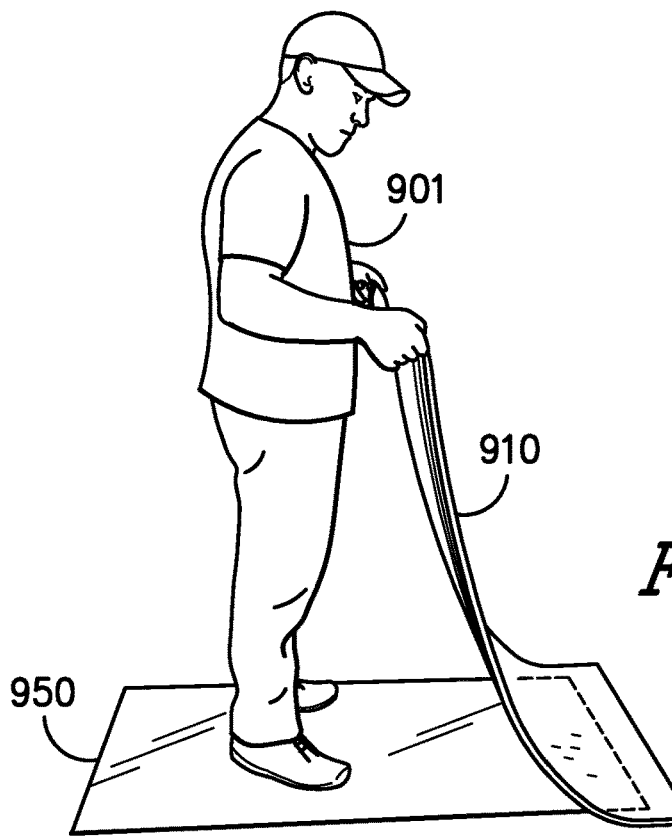
FIG. -9C-
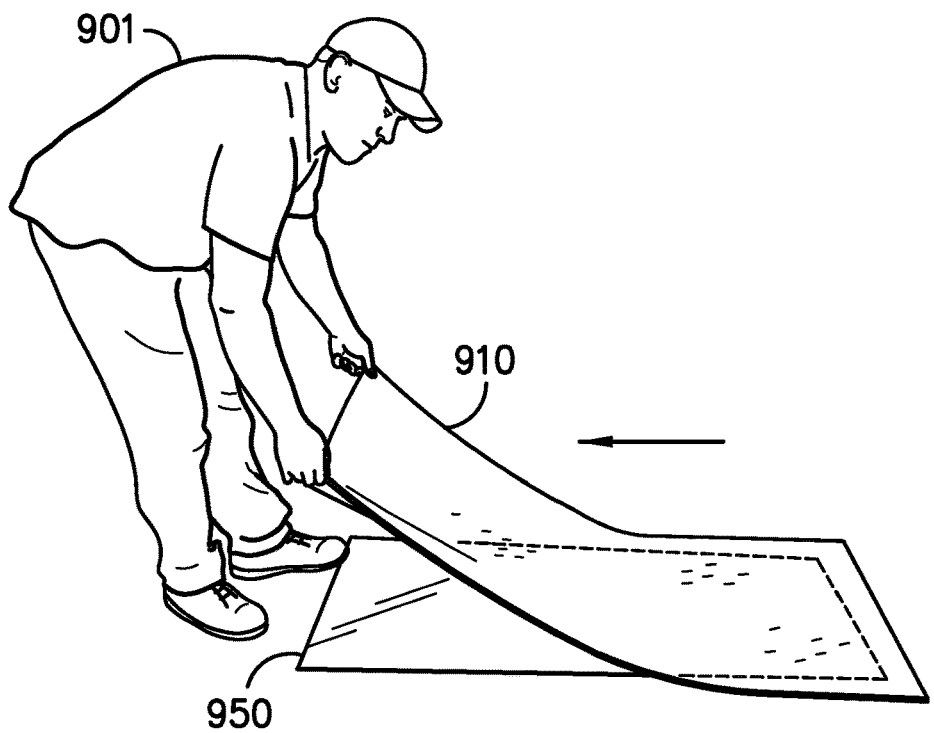
FIG. -9D-

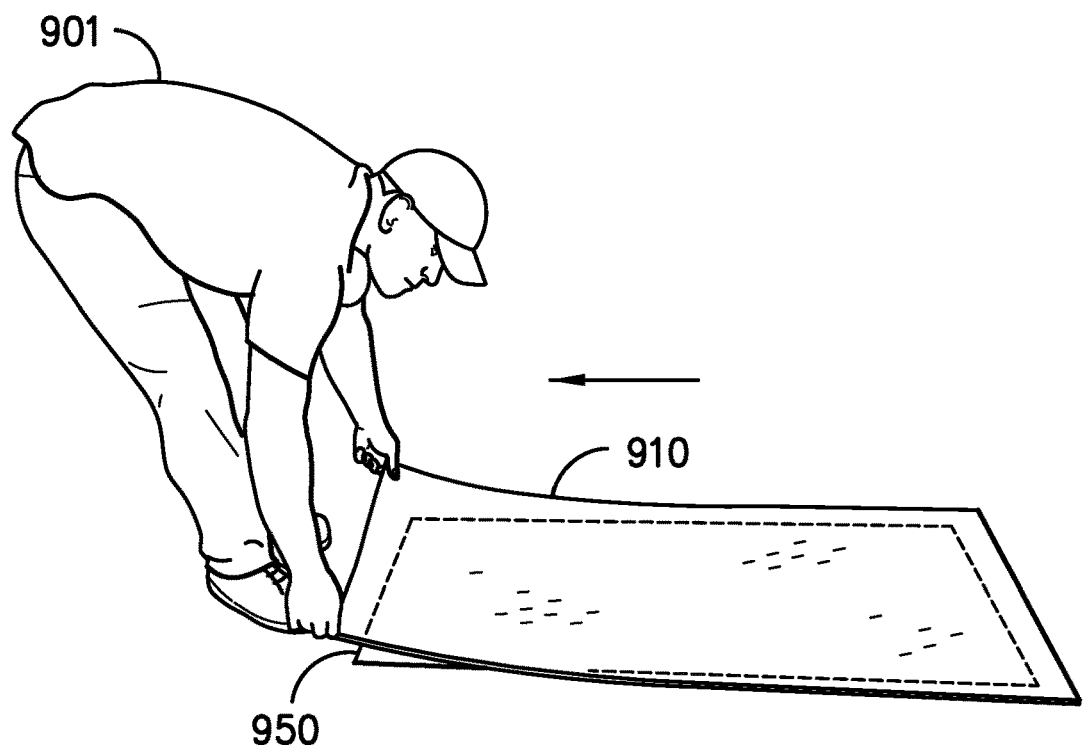
FIG. -9E-
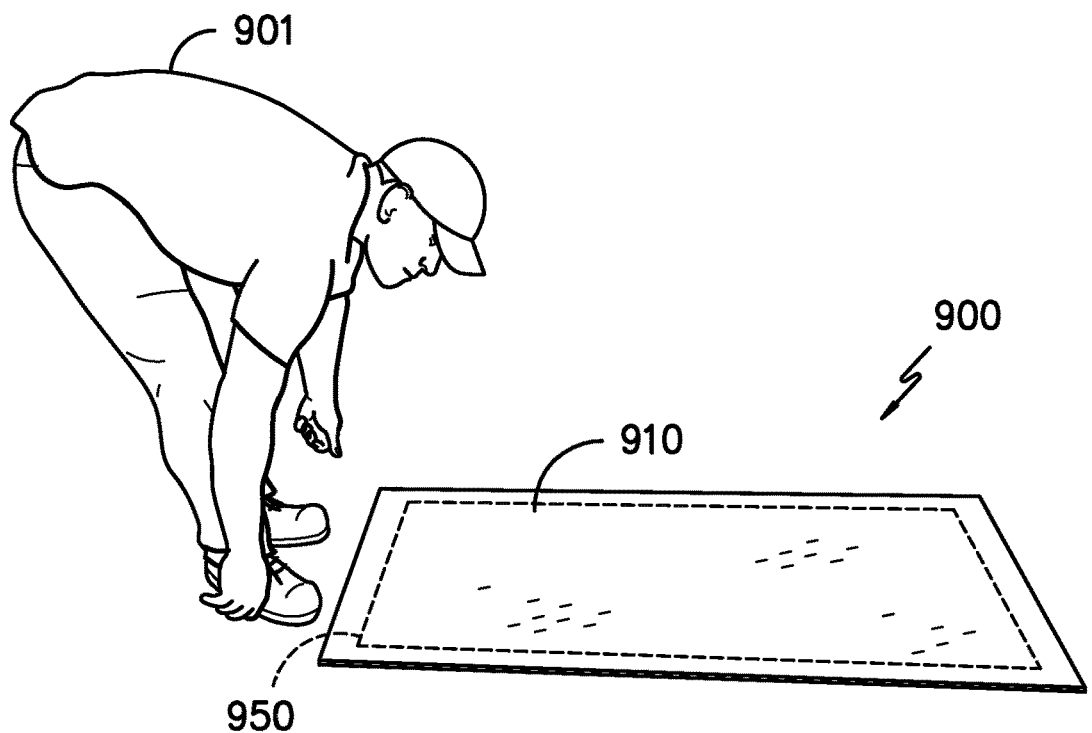
FIG. -9F-

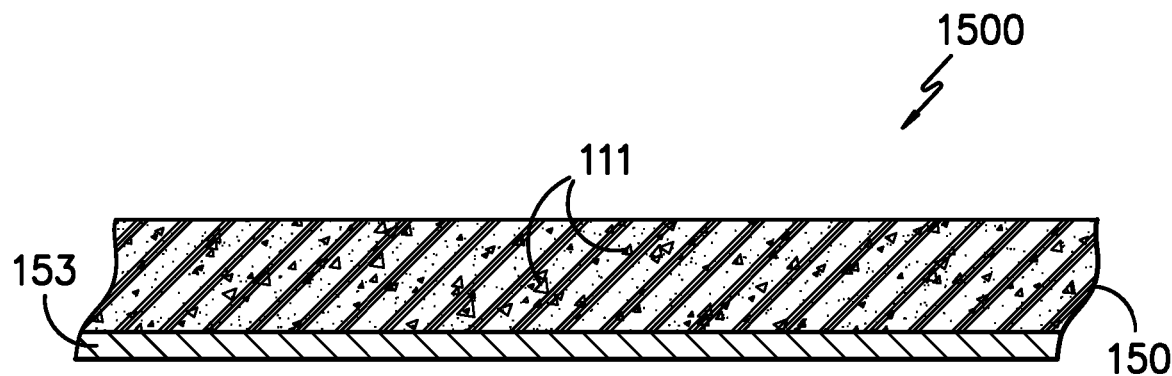
FIG. -10A-
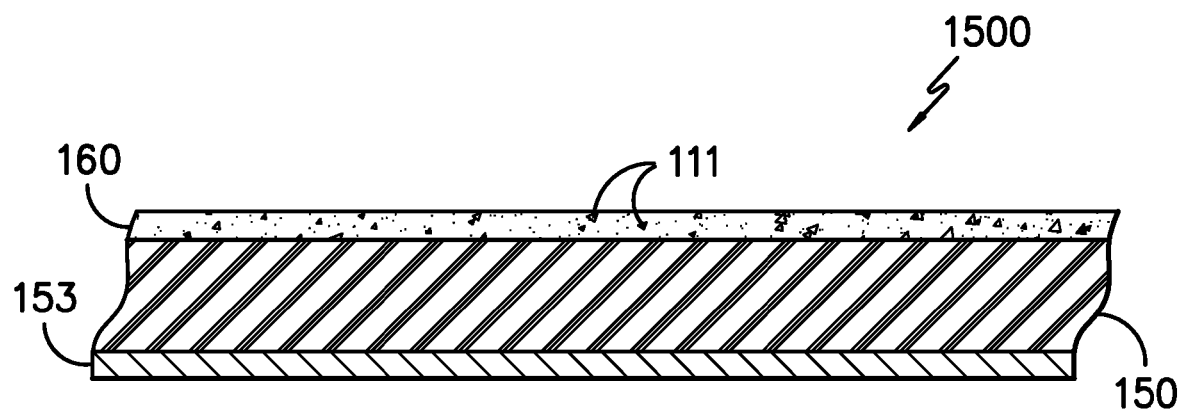
FIG. -10B-

FLOOR MAT WITH HIDDEN BASE COMPONENT

CROSS REFERENCE TO RELATED APPLICATIONS

This application is a divisional of and claims priority to U.S. patent application Ser. No. 16/109,930, entitled "Floor Mat with Hidden Base Component" which was filed on Aug. 23, 2018, which is a continuation of and claims priority to U.S. patent application Ser. No. 15/648,706, entitled "Floor Mat with Hidden Base Component" which was filed on Jul. 13, 2017, which is a non-provisional of and claims priority to U.S. Provisional Patent Application No. 62/378,739, entitled "Floor Mat with Hidden Base Component" which was filed on Aug. 24, 2016, all of which are entirely incorporated by reference herein.

TECHNICAL FIELD

This invention relates to a washable multi-component magnetic floor mat with a hidden base component. The floor mat contains a textile component and a base component. The textile component and the base component are attached to one another by magnetic attraction. The magnetic attraction is provided by incorporation of magnetic particles in both the textile and base components. The textile component is designed to be soiled, washed, and re-used, thereby providing ideal end-use applications in areas such as building entryways. The present invention eliminates the need to wash the base component of the floor mat which results in environmental, cost and labor conservation. Alignment and deployment of the textile component with the base component in an efficient manner is also described herein.

BACKGROUND

High traffic areas, such as entrances to buildings, restrooms, break areas, etc., typically have the highest floorcovering soiling issue. Currently, washable one-piece mats having a pile surface are found in these locations. The washable multi-component magnetic floor mat of the present invention is designed to replace these one-piece floor mats. The use of washable multi-component floor mats in high traffic, highly soiled areas is pragmatic because the soiled textile component may be easily removed, laundered, and re-installed. The need to launder the base portion of the floor mat is eliminated. The reduction in weight and bulk from one-piece mats to the textile component of the multi-component mat provides significant savings in water and energy for the laundering facilities and in labor for the service people that transport and install the floor mats.

Furthermore, because the attachment and/or alignment mechanisms can utilize a high amount of force to hold the top and bottom components of the floor mat together, the initial alignment and deployment of the top textile component onto the base component can present challenges. This problem is exaggerated by the large surface area of the two components that are in contact with one another. In this regard, even if the adherence force per unit area is low, the large surface area means that the total resistance to sliding and movement can be very high making realignment of the components very difficult. If not corrected, mis-alignment of the textile component with the base component may create trip hazards within the floor mat and may be aesthetically not pleasing.

The present invention overcomes these challenges via the use of alignment and deployment techniques that rely upon temporary reduction in surface area of the textile and/or base component and/or temporary reduction in adherence force between the textile and base components. Thus, the washable multi-component magnetic floor mats of the present invention are an improvement over one-piece floor mats of the prior art.

BRIEF SUMMARY

In one aspect, the invention relates to a multi-component floor mat comprising: (a) a textile component comprising (i) a first layer of tufted pile carpet formed by tufting face yarns through a primary backing layer and (ii) a second layer of vulcanized rubber material that contains magnetic particles; (b) a base component comprised of (i) vulcanized rubber that contains magnetic particles or (ii) vulcanized rubber having a magnetic coating applied thereto; wherein the textile component and the base component are releasably attachable to one another via magnetic attraction; and wherein the textile component is at least 5% larger in length and width than the base component.

In another aspect, the invention relates to a process for cleaning a multi-component floor mat, said process comprising the steps of: (a) providing the multi-component floor mat as described herein; (b) removing the textile component from the base component; (c) laundering the textile component in an industrial, commercial, or residential washing machine; and (d) re-installing the textile component on the base component.

In another aspect, the invention relates to a process for making a multi-component floor mat, said process comprising the steps of: (a) tufting face yarns into a primary backing material to form a tufted pile carpet; (b) optionally, printing the tufted pile carpet; (c) providing a layer of unvulcanized rubber that contains magnetic particles; (d) adhering the tufted pile carpet to the layer of magnetic particle-containing unvulcanized rubber via a rubber vulcanization process to form a washable textile component having a vulcanized rubber backing; (e) cutting the textile component into a shape and size wherein the textile component is at least 5% larger in length and width than the base component; (f) providing a base component comprised of (i) vulcanized rubber and magnetic particles or (ii) vulcanized rubber and a magnetic coating; and (g) attaching the textile component to the base component via magnetic attraction.

In a further aspect, the invention relates to a method for installation of a floor mat comprising the following steps: (a) providing a base component, wherein the base component contains at least one alignment mechanism; (b) providing a textile component, wherein the textile component is comprised of tufted pile carpet and contains at least one alignment mechanism that works in corresponding relationship with the at least one alignment mechanism of step "a," wherein the base component and the textile component are releasably attachable to one another via the at least one alignment mechanism, and wherein the textile component is at least 5% larger in length and width than the base component; (c) aligning the textile component with the base component, wherein the step of aligning is accomplished via the use of the alignment mechanisms; and (d) deploying the textile component onto the base component.

In another aspect, the invention relates to a multi-component floor mat comprising: (a) a textile component comprising (i) a first layer of tufted pile carpet formed by tufting face yarns through a primary backing layer and (ii) a second layer of vulcanized rubber material that contains magnetic particles; (b) a base component comprised of (i) vulcanized rubber that contains magnetic particles or (ii) vulcanized rubber having a magnetic coating applied thereto; wherein the textile component and the base component are releasably attachable to one another via magnetic attraction, and wherein the textile component is at least 5% larger in length and width than the base component; and (c) at least one alignment or deployment mechanism.

In a further aspect, the invention relates to a multi-component floor mat comprising: (a) a textile component comprising (i) a first layer of tufted pile carpet formed by tufting face yarns through a primary backing layer and (ii) a second layer of vulcanized rubber material that contains magnetic particles; and (b) a base component comprised of (i) materials selected from the group consisting of concrete, cellulose-containing materials, metal, thermoplastic materials, thermoset materials, and combinations thereof, and (ii) magnetic particles or a magnetic coating applied to the base component; wherein the textile component and the base component are releasably attachable to one another via magnetic attraction, and wherein the textile component is at least 5% larger in length and width than the base component.

In a further aspect, the invention relates to a multi-component floor mat comprising: (a) a textile component comprising (i) a first layer of tufted pile carpet formed by tufting face fibers through a primary backing layer and (ii) at least one surface attachment means; and (b) a base component, wherein the base component contains at least one surface attachment means; and wherein the textile component and the base component are releasably attachable to one another via the at least one surface attachment means; wherein the textile component and the base component further contain at least one edge attachment means; and wherein the textile component is at least 5% larger in length and width than the base component.

BRIEF DESCRIPTION OF THE DRAWINGS

FIG. 1A is an expanded side view of the textile component of the multi-component floor mat.

FIG. 1B is an expanded side view of another embodiment of the textile component of the multi-component floor mat.

FIG. 1C is a top perspective view of one embodiment of the back surface of the textile component of the floor mat.

FIG. 1D is an expanded angle view of one embodiment of the multi-component floor mat showing the textile component of FIG. 1C partially pulled back from the base component.

FIG. 2 is a top perspective view of another embodiment of the multi-component floor mat with the textile component partially pulled back from the base component.

FIG. 3A is a top perspective view of the back surface of the textile component of the multi-component floor mat illustrating a recessed border area along the edge of the textile component.

FIG. 3B is a top perspective view of an multi-component floor mat illustrating the textile component of FIG. 3A partially pulled back and in combination with the base component.

FIG. 4A is a top perspective view of another embodiment of the back surface of the textile portion of the multi-component floor mat illustrating rounded corners.

FIG. 4B is a top perspective view of a multi-component floor mat illustrating the textile component of FIG. 4A partially pulled back and in combination with the base component.

FIG. 5A is a top perspective view of the back surface of a multi-component floor mat illustrating the textile component having a raised, 3-dimensional chevron rubber shaped protrusion on its back surface and the base component having a corresponding chevron shaped receiving area at one end of the base component.

FIG. 5B illustrates the back surface of the multi-component floor mat and alignment of the textile component with the base component.

FIG. 6A is a top perspective view of the back surface of a multi-component floor mat illustrating the textile component having a raised, 3-dimensional half circle rubber-shaped protrusion on its back surface and the base component having a corresponding half circle shaped receiving area at one end of the base component.

FIG. 6B illustrates the back surface of the multi-component floor mat and alignment of the textile component with the base component.

FIG. 7 is a schematic diagram of one embodiment of the manufacturing process of the multi-component floor mat.

FIG. 8 is a schematic diagram illustrating the magnetic alignment properties of the magnetic particles of the present invention.

FIG. 9A is a schematic diagram illustrating a step in the installation of a multi-component floor mat of the present invention.

FIG. 9B is a schematic diagram illustrating a step in the installation of a multi-component floor mat of the present invention.

FIG. 9C is a schematic diagram illustrating a step in the installation of a multi-component floor mat of the present invention.

FIG. 9D is a schematic diagram illustrating a step in the installation of a multi-component floor mat of the present invention.

FIG. 9E is a schematic diagram illustrating a step in the installation of a multi-component floor mat of the present invention.

FIG. 9F is a schematic diagram illustrating a step in the installation of a multi-component floor mat of the present invention.

FIG. 10A is an expanded side view of an adhesive-containing base component of the multi-component floor mat.

FIG. 10B is an expanded side view of another embodiment of an adhesive-containing base component of the multi-component floor mat.

DETAILED DESCRIPTION

The present invention described herein is a washable, multi-component magnetic floor mat. The mat is comprised of a textile component and a base component. The textile component and the base component are attached to one another via magnet attraction.

In the present invention, the base component of the floor mat is wholly covered with a textile component. Typically, the textile component will be lighter in weight than the base component. Inversely, the base component will weigh more than the textile component.

As shown in FIG. 1A, textile component 100 may be comprised of tufted pile carpet 125. Tufted pile carpet 125 is comprised of primary backing layer 117 and face yarns 115. The primary backing layer 117 is typically included in the tufted pile carpet to give stability to the face yarns. The materials comprising face yarns 115 and primary backing layer 117 may independently be selected from synthetic fiber, natural fiber, man-made fiber using natural constituents, inorganic fiber, glass fiber, and a blend of any of the foregoing. By way of example only, synthetic fibers may include polyester, acrylic, polyamide, polyolefin, polyaramid, polyurethane, or blends thereof. More specifically, polyester may include polyethylene terephthalate, polytrimethylene terephthalate, polybutylene terephthalate, polylactic acid, or combinations thereof. Polyamide may include nylon 6, nylon 6,6, or combinations thereof. Polyolefin may include polypropylene, polyethylene, or combinations thereof. Polyaramid may include poly-p-phenyleneteraphthalamide (i.e., Kevlar®), poly-m-phenyleneteraphthalamide (i.e., Nomex®), or combinations thereof. Exemplary natural fibers include wool, cotton, linen, ramie, jute, flax, silk, hemp, or blends thereof. Exemplary man-made materials using natural constituents include regenerated cellulose (i.e., rayon), lyocell, or blends thereof.

The material comprising face yarns 115 and primary backing layer 117 may be formed from staple fiber, filament fiber, slit film fiber, or combinations thereof. The fiber may be exposed to one or more texturing processes. The fiber may then be spun or otherwise combined into yarns, for example, by ring spinning, open-end spinning, air jet spinning, vortex spinning, or combinations thereof. Accordingly, the material comprising face yarns 115 will generally be comprised of interlaced fibers, interlaced yarns, loops, or combinations thereof.

The material comprising face yarns 115 and primary backing layer 117 may be comprised of fibers or yarns of any size, including microdenier fibers or yarns (fibers or yarns having less than one denier per filament). The fibers or yarns may have deniers that range from less than about 0.1 denier per filament to about 2000 denier per filament or, more preferably, from less than about 1 denier per filament to about 500 denier per filament.

Furthermore, the material comprising face yarns 115 and primary backing layer 117 may be partially or wholly comprised of multi-component or bi-component fibers or yarns in various configurations such as, for example, islands-in-the-sea, core and sheath, side-by-side, or pie configurations. Depending on the configuration of the bi-component or multi-component fibers or yarns, the fibers or yarns may be splittable along their length by chemical or mechanical action.

Additionally, face yarns 115 and primary backing layer 117 may include additives coextruded therein, may be precoated with any number of different materials, including those listed in greater detail below, and/or may be dyed or colored to provide other aesthetic features for the end user with any type of colorant, such as, for example, poly (oxyalkylenated) colorants, as well as pigments, dyes, tints, and the like. Other additives may also be present on and/or within the target fiber or yarn, including antistatic agents, brightening compounds, nucleating agents, antioxidants, UV stabilizers, fillers, permanent press finishes, softeners, lubricants, curing accelerators, and the like.

The face yarns 115 may be dyed or undyed. If the face yarns 115 are dyed, they may be solution dyed. The weight of the face yarn, pile height, and density will vary depending on the desired aesthetics and performance requirements of the end-use for the floor mat. In FIG. 1A, face yarns 115 are illustrated in a loop pile construction. Looking to FIG. 1B, textile component 100 is shown with face yarns 115 in a cut pile construction. Of course, it is to be understood that face yarn constructions including combinations of loop pile and cut pile may likewise be used.

The primary backing layer 117 can be any suitable primary backing material. The primary backing layer 117 may be comprised of a woven, nonwoven or knitted material, or combinations thereof. The general purpose of primary backing layer 117 is to support the tufts of face yarns 115. In one aspect, primary backing layer 117 is a nonwoven polyester spunbond material. One commercially available example of the polyester spunbond material is Lutradur® from Freudenberg Nonwovens of Weinheim, Germany. In another aspect, flat woven polyester tapes, such as Isis™ from Propex of Chattanooga, TN, may be utilized. Also, Colback® nonwoven backing material may also be suitable for use. If needed, a primary backing layer made of a woven tape with either staple fibers or nonwoven fabrics affixed can be used. Also, stitch bonded and knitted polyester fabrics may be used.

The tufted pile carpet 125 that includes face yarns tufted into a primary backing layer may be heat stabilized to prevent dimensional changes from occurring in the finished mat. The heat stabilizing or heat setting process typically involves applying heat to the material that is above the glass transition temperature, but below the melting temperature of the components. The heat allows the polymer components to release internal tensions and allows improvement in the internal structural order of the polymer chains. The heat stabilizing process can be carried out under tension or in a relaxed state. The tufted pile carpet is sometimes also stabilized to allow for the yarn and primary backing to shrink prior to the mat manufacturing process.

In one aspect of the present invention, the tufted pile carpet is comprised of yarn tufted into fabric, which is then injection or fluid dyed, and then bonded with a rubber layer or washable latex backing. The carpet yarn may be selected from nylon 6; nylon 6,6; polyester; and polypropylene fiber. The yarn is tufted into a woven or nonwoven substrate. The yarn can be of any pile height and weight necessary to support printing. The tufted pile carpet may be printed using any print process. In one aspect, injection dyeing may be utilized to print the tufted pile carpet.

Printing inks will contain at least one dye. Dyes may be selected from acid dyes, direct dyes, reactive dyes, cationic dyes, disperse dyes, and mixtures thereof. Acid dyes include azo, anthraquinone, triphenyl methane and xanthine types. Direct dyes include azo, stilbene, thiazole, dioxsazine and phthalocyanine types. Reactive dyes include azo, anthraquinone and phthalocyanine types. Cationic dyes include thiazole, methane, cyanine, quinolone, xanthene, azine, and triaryl methine. Disperse dyes include azo, anthraquinone, nitrodiphenylamine, naphthal imide, naphthoquinone imide and methane, triarylmethine and quinoline types.

As is known in the textile printing art, specific dye selection depends upon the type of fiber and/or fibers comprising the washable textile component that is being printed. For example, in general, a disperse dye may be used to print polyester fibers. Alternatively, for materials made from cationic dyeable polyester fiber, cationic dyes may be used.

The printing process of the present invention uses a jet dyeing machine, or a digital printing machine, to place printing ink on the surface of the mat in predetermined locations. One suitable and commercially available digital printing machine is the Millitron® digital printing machine, available from Milliken & Company of Spartanburg, South Carolina. The Millitron® machine uses an array of jets with continuous streams of dye liquor that can be deflected by a controlled air jet. The array of jets, or gun bars, is typically stationary. Another suitable and commercially available digital printing machine is the Chromojet® carpet printing machine, available from Zimmer Machinery Corporation of Spartanburg, South Carolina. In one aspect, a tufted carpet made according to the processes disclosed in U.S. Pat. Nos. 7,678,159 and 7,846,214, both to Weiner, may be printed with a jet dyeing apparatus as described and exemplified herein.

Viscosity modifiers may be included in the printing ink compositions. Suitable viscosity modifiers that may be utilized include known natural water-soluble polymers such as polysaccharides, such as starch substances derived from corn and wheat, gum arabic, locust bean gum, tragacanth gum, guar gum, guar flour, polygalactomannan gum, xanthan, alginates, and a tamarind seed; protein substances such as gelatin and casein; tannin substances; and lignin substances. Examples of the water-soluble polymer further include synthetic polymers such as known polyvinyl alcohol compounds and polyethylene oxide compounds. Mixtures of the aforementioned viscosity modifiers may also be used. The polymer viscosity is measured at elevated temperatures when the polymer is in the molten state. For example, viscosity may be measured in units of centipoise at elevated temperatures, using a Brookfield Thermosel unit from Brookfield Engineering Laboratories of Middleboro, MA. Alternatively, polymer viscosity may be measured by using a parallel plate rheometer, such as made by Haake from Rheology Services of Victoria Australia.

After printing, the tufted pile carpet may be vulcanized with a rubber backing. The thickness of the rubber will be such that the height of the finished textile component will be substantially the same height as the surrounding base component when the base component is provided in a tray configuration. Once vulcanized, the textile component may be pre-shrunk by washing it prior to installing it on the base component.

The textile component 100 further comprises a magnetic coating layer 110. The magnetic coating layer 110 is present on the surface of the textile component 100 that is opposite face yarns 115. The magnetic coating layer is at least one surface attachment means. Application of magnetic coating layer 110 to the tufted pile carpet 125 will be described in greater detail below. The resulting textile component 100 is wash durable and exhibits sufficient tuft lock for normal end-use applications. In one alternative embodiment of the invention, the textile component may be a disposable textile component that is removed and disposed of or recycled and then replaced with a new textile component for attachment to the base component.

After the textile component has been made, it will be custom cut to fit onto the base component. The textile component may be cut using a computer controlled cutting device, such as a Gerber machine. It may also be cut using a mechanical dye cutter, hot knife, straight blade, rotary blade, water jet, laser, and the like, and combinations thereof. In one aspect of the invention, the textile component will have substantially the same dimensions as the base component (e.g. the same length and width). In another aspect, the textile component will be larger in size than the base component. For example, the textile component will have a larger length and/or width than that base component. In one aspect, the textile component may be at least 5% wider than the base component, or at least 10% wider than the base component, or at least 20% wider than the base component, or at least 30% wider than the base component. In addition, or alternatively, the textile component may be at least 5% longer than the base component, or at least 10% longer than the base component, or at least 20% longer than the base component, or at least 30% longer than the base component. Any combination of widths and lengths disclosed herein may be suitable for use as dimensions of the multi-component floor mat of the present invention.

FIG. 1C illustrates one embodiment of the textile component of the multi-component floor mat of the present invention. The back surface 101 of textile component 100 is shown with elongated oval protrusions 103. Elongated oval protrusions 103 are spaced along the inner edge of textile component 100. The elongated oval protrusions are raised from the planar surface of textile component 100 and are 3-dimensional in space. Elongated oval protrusions 103 may be spaced in a uniform or non-uniform configuration from one another. In one aspect, elongated oval protrusions 103 are comprised of rubber and are attached to textile component 100 through a rubber vulcanization process using heat and pressure.

FIG. 1D illustrates multi-component floor mat 1 comprised of textile component 100 and base component 150. Elongated oval protrusions 103 of textile component 100 are aligned with elongated oval receiving areas 105 of base component 150. When textile component 100 is aligned with base component 150, elongated oval protrusions 103 fit into the open space provided by elongated oval receiving areas 105.

While not specifically illustrated in FIGS. 1C and 1D, the floor mat of the present invention may further include at least one edge attachment means. The at least one edge attachment means may be included in the construction of the floor mat to aid in securing and aligning the textile component of the mat to the base component of the mat. Thus, the textile component and the base component may both further include at least one edge attachment means. Edge attachment and/or alignment means include hook and loop fastening systems (such as Velcro® fasteners), mushroom-type hook fastening systems (such as Dual Lock™ fasteners from 3M), and the like, and combinations thereof. For example, the loop portion of a hook and loop fastening system may be attached to the textile component. The corresponding hook portion of the hook and loop fastening system may be attached to the base component. The alternative arrangement of loop and hook portions is also contemplated to be within the scope of this invention wherein the loop portion is attached to the base component and the hook portion is attached to the textile component. In addition, the edge attachment means (e.g. hook and loop fastening system) may be used alone, without an alignment mechanism, to attach the textile component to the base component. The edge attachment means may be present on one edge, on two edges, on three edges, or on all four edges of the textile and/or base component.

FIG. 2 illustrates another embodiment of the multi-component floor mat of the present invention. Floor mat 2 is comprised of textile component 200 and base component 250. Round protrusions 203 of textile component 200 are aligned with round receiving areas 205 of base component 250. When textile component 200 is aligned with base component 250, round protrusions 203 fit into the open space provided by round receiving areas 205. Any of the protrusions described herein for securing the textile component to the base component are also known as surface attachment means, along with magnetic coatings, and any combinations thereof.

The base component of the floor mat may be flat and have no recessed area (i.e. the base component is trayless). A flat base component is manufactured from a sheet of material, such as a rubber material, that has been cut in the desired shape and vulcanized. The base component may be formed in a single molding process as a unitary article. Examples of suitable materials for forming the base component are elastomers, such as natural and synthetic rubber materials, thermoplastic and thermoset resins and metal. The rubber material may be selected from the group consisting of nitrile rubber, including dense nitrile rubber, foam nitrile rubber, and mixtures thereof; polyvinyl chloride rubber; ethylene propylene diene monomer (EPDM) rubber; vinyl rubber; thermoplastic elastomer; and mixtures thereof. In one aspect, the base component is typically comprised of at least one rubber material. The rubber material may contain from 0% to 40% of a recycled rubber material.

FIG. 3A illustrates another embodiment of the textile component of the floor mat of the present invention. In FIG. 3A, textile component 300 is shown with back surface 301 facing the viewer. Textile component 300 is shown with corners that are approximately 90 degrees in shape, i.e. two sides come together and form approximately a 90 angle. On back surface 301, there is a border 370. Border 370 is attached to back surface 301. Border 370 is a raised, 3-dimensional area which is present in continuous arrangement along all inner edges of textile component 300. In one aspect, border 370 is comprised of rubber and is attached to back surface 301 via a rubber vulcanization process that includes heat and pressure. While border 370 is shown in a continuous configuration around all four inner edges of textile component 300, it is contemplated that the border may be present on only one inner edge of the textile component, on only two inner edges of the textile component, or on only three inner edges of the textile component.

As seen in FIG. 3B, floor mat 3 is present in an arrangement wherein textile component 300 overlaps base component 350. Base component 350 is also shown with corners formed from two sides coming together at approximately a 90 degree angle. The length and width of textile component 300 are larger in size than the length and width of base component 350. A corner of textile component 300 is turned back to further illustrate how the two components fit together within border 370.

FIG. 4A illustrates another embodiment of the textile component of the floor mat of the present invention. In FIG. 4A, textile component 400 is shown with back surface 401 facing the viewer. Textile component 400 is also shown with rounded corners. On back surface 401, there is a border 470. Border 470 is attached to back surface 401. Border 470 is a raised, 3-dimensional area which is present in continuous arrangement along all edges of textile component 400. In one aspect, border 470 is comprised of rubber and is attached to back surface 401 via a rubber vulcanization process that includes heat and pressure. While border 470 is shown in a continuous configuration around all four edges of textile component 400, it is contemplated that the border may be present on only one edge of the textile component, on only two edges of the textile component, or on only three edges of the textile component.

As seen in FIG. 4B, floor mat 4 is present in an arrangement wherein textile component 400 overlaps base component 450. Base component 450 is also shown with rounded corners. The length and width of textile component 400 are larger in size than the length and width of base component 450. Base component 450 is not visually observable in its end-use application as a floor mat because it is completely covered by textile component 400. A corner of textile component 400 is turned back to further illustrate how the two components fit together within border 470.

FIG. 5A illustrates another embodiment of the multi-component floor mat of the present invention. Floor mat 5 is comprised of textile component 500 and base component 550. Textile component 500 is shown with back surface 501 facing the viewer. Textile component 500 contains an alignment mechanism 503. In this instance, alignment mechanism 503 is a V-shaped, 3-dimensional area located at one end of floor mat 5. In one aspect, alignment mechanism 503 is comprised of rubber and is attached to back surface 501 via a rubber vulcanization process that includes heat and pressure. Base component 550 contains a cut-out area 505 that corresponds in size and shape to alignment mechanism 503 of textile component 550.

As seen in FIG. 5B, the cut out area 505 of base component 550 fits snugly against alignment mechanism 503 of textile component 500. Floor mat 5 is present in an arrangement wherein textile component 500 is larger in size than base component 550. Note that in order to illustrate how base component 550 and textile component 500 are aligned together, floor mat 5 is shown flipped over, with the face yarns toward the floor and the back surface facing the viewer. Base component 550 is not visually observable in its end-use application as a floor mat because it is completely covered by textile component 500.

FIG. 6A illustrates another embodiment of the multi-component floor mat of the present invention. Floor mat 6 is comprised of textile component 600 and base component 650. Textile component 600 is shown with back surface 601 facing the viewer. Textile component 600 contains an alignment mechanism 603. In this instance, alignment mechanism 603 is a half circle-shaped, 3-dimensional area located at one end of floor mat 6. In one aspect, alignment mechanism 603 is comprised of rubber and is attached to back surface 601 via a rubber vulcanization process that includes heat and pressure. Base component 650 contains a cut-out area 605 that corresponds in size and shape to alignment mechanism 603 of textile component 650.

As seen in FIG. 6B, the cut out area 605 of base component 650 fits snugly against alignment mechanism 603 of textile component 600. Floor mat 6 is present in an arrangement wherein textile component 600 is larger in size than base component 650. Note that in order to illustrate how base component 650 and textile component 600 are aligned together, floor mat 6 is shown flipped over, with the face yarns toward the floor and the back surface facing the viewer. Base component 650 is not visually observable in its end-use application as a floor mat because it is completely covered by textile component 600.

In summary, the textile component and base component that form the floor mat of the present invention may include a discontinuous alignment mechanism that attaches the textile component to the base component, such as that which is shown in FIGS. 1C and 1D. The alignment mechanism acts to secure the textile component to the base component. The alignment mechanism may be present on the textile and base components at a location that comprises the inner edge of each component. This inner edge area may begin at about 0.5 inches, or at about 1.0 inches, or at about 1.5 inches, or at about 2.0 inches or greater from the cut edge (or molded edge) of the component and measuring towards the center of the component. The discontinuous alignment mechanism present in an area along this inner edge portion of the textile and base components as described above is illustrated in FIGS. 1C, 1D and 5A to 6B. A continuous alignment mechanism may be present on the textile component of the floor mat of the present invention. The continuous alignment mechanism present in an area along this inner edge portion of the textile component as described above is illustrated in FIGS. 3A and 3B.

Alternatively, the alignment mechanism may be present at the very edge of the textile component of the multi-component floor mat. FIGS. 4A and 4B illustrate a continuous alignment mechanism present on the textile component of the floor mat. The alignment mechanism is located at the cut edge (or molded edge) of the textile component such that it forms a rim around the cut edge (or molded edge) of the textile component. The alignment mechanism is present along the perimeter of the textile component. In this instance, the multi-component floor mat is comprised of a textile component with a continuous alignment mechanism and an undersized base component (i.e. a base component that is smaller in size than the textile component). One advantage of this arrangement is that the presence of the alignment mechanism at the cut edge (or molded edge) of the textile component provides increased thickness at the edge which in turn provides increased tear resistance to the textile component. The tear resistance feature provides further wash durability to the textile component.

It is also contemplated to be within the scope of the present invention that any combination of elements illustrated in the Figures and/or described herein may be used to form the floor mat of the present invention. For example, the features illustrated in FIGS. 3A and 5A may be combined together in a floor mat. Or, the features illustrated in FIGS. 3A and 6A may be combined together in a floor mat. In another aspect of the invention, the textile component of FIG. 1C may be combined with the base component of FIG. 3B.

The continuous perimeter border may be applied to the textile component according to the following procedure. Rubber strips are placed overlapping the edges of a metal plate. The metal plate is to be placed on top of a sheet rubber and covered on all 4 sides by strip rubber. As the metal plate applies force to the rubber, it will bond the sheet rubber to the strips. This process may be completed, for example, at a temperature of 370° F. and a pressure of 36 psi. However, depending upon the rubber materials selected, the temperature may be in the range from 200° F. to 500° F. and the pressure may be in the range from 10 psi to 50 psi. Using the recommend settings, the rubber may be completely cured in 8 minutes. After the rubber strips are bound to the rubber sheet, the metal plate is removed leaving a void (i.e. a recessed area in the textile component) in which to place the base component. The textile component has the ability to be deployed/installed and removed/uninstalled from the base component multiple times. The continuous perimeter border can have a smooth or a cleated surface or any other pattern (e.g. Megahold) to assist in holding the edges of the textile component to the floor. Note that in one aspect of this invention, at least a portion of the back surface of the textile component makes direct physical contact with the floor.

The textile component and the base component may be of the same size (e.g. same length and width) or the textile component may be larger in size than the base component (e.g. larger length and/or width). In instances when the textile component is larger in size than the base component, the textile component may further include a visible rubber border along the edges (or along the perimeter) of textile component. The presence of the border allows the floor mat to resemble a traditional one-piece floor mat having a rubber border along its edges.

In another configuration, the base component may have a gradually varying cross-section providing a thickness gradient from its center to the edges. Further, if the region bounded by the border in the textile component is referred to as a cell, a single textile component may have multiple cells that match up with complimentary features on the base component. The base component itself may be multi-segment.

The textile component and the base component are attached to one another by magnetic attraction. Magnetic attraction is achieved via application of a magnetic coating to the textile component and/or base component or via incorporation of magnetic particles in a rubber-containing layer prior to vulcanization. Alternatively, magnetic attraction can be achieved using both methods such that a magnetic coating is applied to the textile component and magnetic particles are included in the vulcanized rubber of the base component. The inverse arrangement is also contemplated.

The magnetic coating may be applied to the textile component and/or the base component by several different manufacturing techniques. Exemplary coating techniques include, without limitation, knife coating, pad coating, paint coating, spray application, roll-on-roll methods, troweling methods, extrusion coating, foam coating, pattern coating, print coating, lamination, and mixtures thereof.

FIG. 7 illustrates one embodiment of the manufacturing process of the textile component of the present invention. The uncoated tufted pile carpet 725 is fed to laminating belt 710. The belt moves through the coating zone to lamination zone of the lamination press. A magnetic coating 720 is fed transversely to laminating belt 710. As magnetic coating 720 is fed to laminating belt 710, it passes under coating knife 730. The coating knife 730 is adjusted so that the desired coating thickness is achieved. For example, a magnetic coating thickness of 25 mil may be desirable. After magnetic coating 720 passes under coating knife 730, it comes into contact with tufted pile carpet 725. The magnetic coating 720 and tufted pile carpet 725 then move transversely to laminating press 740. Laminating press 740 is located above laminating belt 710. The laminating press 740 is lowered onto laminating belt 710, pressing tufted pile carpet 725 and magnetic coating 720 together. The laminating press 740 is heated and therefore provides both heat and pressure to the lamination process. Providing heat at this point of the lamination process further serves to cure any materials (e.g. binder materials) that may be contained within the magnetic coating. After a pre-determined amount of time, laminating press 740 is lifted from laminating belt 710. The magnetic coating 720 is now laminated to tufted pile carpet 725 to form textile component 750. In one aspect, the laminating press may be operated at a temperature in the range from 200° F. to 500° F. and at a pressure in the range from 10 psi to 50 psi, or even at 300° F. and a pressure of 36 psi.

In instances wherein magnetic attraction is achieved by incorporating magnetic particles in a rubber-containing layer, the following procedure may be utilized: (a) an unvulcanized rubber-containing material is provided (such as nitrile, SBR, or EPDM rubber), (b) magnetic particles are added to the unvulcanized rubber, (c) the particles are mixed with the rubber, and (d) the mixture of step "c" is formed into a sheet and attached to the bottom of the textile component and/or represents the base component. Mixing in step "c" may be achieved via a rubber mixing mill.

FIG. 8 is provided in order to illustrate some of the terms used herein with respect to various types of magnets and magnetization properties. In this application, magnetizable is defined to mean the particles present in the coating or vulcanized rubber layer are permanently magnetized or can be magnetized permanently using external magnets or electromagnets. Once the particles are magnetized, they will keep their magnetic response permanently. The magnetizable behavior for generating permanent magnetism falls broadly under ferromagnets and ferrimagnets. Barium ferrites, strontium ferrites, neodymium and other rare earth metal based alloys are non-limiting examples of materials that can be applied in the magnetic coatings and/or vulcanized rubber layer.

As used herein, magnetically receptive is defined to mean the particles present in the coating and/or vulcanized rubber layer are only magnetically responsive in the presence of external magnets. The component that contains the magnetic particles is exposed to a magnetic field which aligns the dipoles of magnetic particles. Once the magnetic field is removed from the vicinity, the particles will become non-magnetic and the dipoles are no longer aligned. The magnetically receptive behavior or responsive magnetic behavior falls broadly under paramagnets or superparamagnets (particle size less than 50 nm).

This feature of materials being reversibly magnetic is shown in FIG. 8 whereby the dipoles of the superparamagnetic or paramagnetic materials are not aligned, but upon exposure to a magnet, the dipoles line up and point in the same direction thereby allowing the materials to exhibit magnetic properties. Non-limiting examples of materials exhibiting these features include iron oxide, steel, iron, nickel, aluminum, or alloys of any of the foregoing.

Further examples of magnetizable magnetic particles include $BaFe_3O_4$, $SrFe_3O_4$, NdFeB, AlNiCo, CoSm and other rare earth metal based alloys, and mixtures thereof. Examples of magnetically receptive particles include $Fe_2O_3$, $Fe_3O_4$, steel, iron particles, and mixtures thereof. The magnetically receptive particles may be paramagnetic or superparamagnetic. The magnet particles are typically characterized as being non-degradable.

In one aspect of the invention, particle size of the magnetically receptive particles is in the range from 1 micron to 10 microns. Particle size of the magnetically receptive particles may be in the range from 10 nm to 50 nm for superparamagnetic materials. Particle size of the magnetically receptive particles is typically greater than 100 nm for paramagnetic and/or ferromagnetic materials.

Magnetic attraction is typically exhibited at any loading of the above magnetic materials. However, the magnetic attraction increases as the loading of magnetic material increases. In one aspect of the invention, the magnetic field strength of the textile component to the base component is greater than 50 gauss, more preferably greater than 100 gauss, more preferably greater than 150 gauss, or even more preferably greater than 200 gauss.

In one aspect, the magnetic material is present in the coating composition in the range from 25% to 95% by weight of the coating composition. In another aspect, magnetic particle loading may be present in the magnetic coating applied to the textile component in the range from 10% to 70% by weight of the textile component. The magnetic particle loading may be present in the magnetic coating applied to the base component in the range from 10% to 90% by weight of the base component.

The magnetically receptive particles may be present in the vulcanized rubber layer of the textile component in a substantially uniform distribution. In another aspect of the present invention, it is contemplated that the magnetically receptive particles are present in the rubber layer of the textile component in a substantially non-uniform distribution. One example of a non-uniform distribution includes a functionally graded particle distribution wherein the concentration of particles is reduced at the surface of the textile component intended for attachment to the base component. Alternatively, another example of a non-uniform distribution includes a functionally graded particle distribution wherein the concentration of particles is increased at the surface of the textile component intended for attachment to the base component.

The magnetic attraction between the textile component and the base component may be altered by manipulation of the surface area of one or both of the textile and/or base components. The surfaces of one or both of the components may be textured in such a way that surface area of the component is increased. Such manipulation may allow for customization of magnetic attraction that is not directly affected by the amount of magnetic particles present in the floor mat.

For instance, a substantially smooth (less surface area) bottom surface of the textile component will generally result in greater magnetic attraction to the top surface of the base component. In contrast, a less smooth (more surface area) bottom surface of the textile component (e.g. one having ripples or any other textured surface) will generally result in less magnetic attraction to the top surface of the base component. Of course, a reverse arrangement is also contemplated wherein the base component contains a textured surface. Furthermore, both component surfaces may be textured in such a way that magnetic attraction is manipulated to suit the end-use application of the inventive floor mat.

As discussed previously, the magnetic particles may be incorporated into the floor mat of the present invention either by applying a magnetic coating to surface of the textile component or by including the particles in the rubber material of the textile material and/or the base component prior to vulcanization. When incorporation is via a magnetic coating, a binder material is generally included. Thus, the magnetic coating is typically comprised of at least one type of magnetic particles and at least one binder material.

The binder material is typically selected from a thermoplastic elastomer material and/or a thermoplastic vulcanite material. Examples include urethane-containing materials, acrylate-containing materials, silicone-containing materials, and mixtures thereof. Barium ferrites, strontium ferrites, neodymium and other rare earth metal based alloys can be mixed with the appropriate binder to be coated on the textile and/or base component.

In one aspect, the binder material will exhibit at least one of the following properties: (a) a glass transition ($T_g$) temperature of less than 10° C.; (b) a Shore A hardness in the range from 30 to 90; and (c) a softening temperature of greater than 70° C.

In one aspect, an acrylate and/or urethane-containing binder system is combined with $Fe_3O_4$ to form the magnetic coating of the present invention. The ratio of $Fe_3O_4$:acrylate and/or urethane binder is in the range from 40-70%:60:30% by weight. The thickness of the magnetic coating may be in the range from 10 mil to 40 mil. Such a magnetic coating exhibits flexibility without any cracking issues.

Following application or inclusion of the magnetic particles into the textile and/or base component, the particles need to be magnetized. Magnetization can occur either during the curing process or after the curing process. Curing is typically needed for the binder material that is selected and/or for the rubber material that may be selected.

During the curing process, the magnetizable particles are mixed with the appropriate binder and applied via a coating technique on the substrate to be magnetized. Once the coating is complete, the particles are magnetized in the presence of external magnets during the curing process. The component that contains the magnetic particles is exposed to a magnetic field which aligns the dipoles of magnetic particles, locking them in place until the binder is cured. The magnetic field is preferably installed in-line as part of the manufacturing process. However, the magnetic field may exist as a separate entity from the rest of the manufacturing equipment.

Alternatively, the magnetic particles may be magnetized after the curing process. In this instance, the magnetizable particles are added to the binder material and applied to the textile and/or base component in the form of a film or coating. The film or coating is then cured. The cured substrate is then exposed to at least one permanent magnet. Exposure to the permanent magnet may be done via direct contact with the coated substrate or via indirect contact with the coated substrate. Direct contact with the permanent magnet may occur, for example, by rolling the permanent magnet over the coated substrate. The magnet may be rolled over the coated substrate a single time or it may be rolled multiple times (e.g. 10 times). The permanent magnet may be provided in-line with the manufacturing process, or it may exist separately from the manufacturing equipment. Indirect contact may include a situation wherein the coated substrate is brought close to the permanent magnet, but does not contact or touch the magnet.

Depending upon the pole size, strength and domains on the permanent magnet (or electromagnet), it can magnetize the magnetizable coating to a value between 10 and 5000 gauss or a value close to the maximum gauss value of the magnetizing medium. Once the coating is magnetized, it will typically remain permanently magnetized.

It is further contemplated to be within the scope of the present invention that the base component of the multi-component floor mat is comprised of any substance that includes a magnetic material. The base component does not have to be comprised of vulcanized rubber. Instead, the base component may be comprised of concrete, cellulose-containing materials (e.g. wood), metal, thermoplastic materials, thermoset materials, and the like, and combinations thereof. In one instance, the base component may be the floor itself where the textile component is to be installed. Herein, the floor would include at least one magnetic material that is used to adhere the textile component to the floor. The textile component can then be laid directly on the floor which has at least one magnetic material applied thereto. Suitable magnetic materials include any of those described previously herein. In one aspect, the magnetic materials may be incorporated into a paint composition and applied to the floor. Or, an electromagnetic force may be applied to the area where the textile component is to be installed. Any of these magnetic features will provide the necessary adherence of the textile component to the floor without the need for a vulcanized rubber base component.

In another aspect of the invention, the base component may be secured to a flooring surface with an adhesive composition. FIGS. 10A and 10B illustrate two different embodiments of adhesive-containing base component 1500. As shown in FIG. 10A, base component 150 contains magnetic particles 111 and adhesive layer 153. In another embodiment, FIG. 10B illustrates base component 150 with magnetic particles 111 contained in magnetic coating layer 160 on one of its surfaces and adhesive composition 153 on its opposite surface (on the floor-facing surface). The flooring surface may be a hard surface (such as concrete, wood, vinyl, tile, and the like), or it may be a carpeted surface (such as tile carpet, broadloom carpet, and the like having a cut and/or loop pile). The adhesive composition may be a pressure sensitive adhesive material (including one that allows for repositioning of the base component), an adhesive material comprised of a rosin ester with an elastomer of water based or solvent based acrylic polymers, or an elastomeric material comprised of natural rubber or nitrile rubber or silicone rubber with a suitable tackifier. The adhesive composition may be used as the sole material securing the base component to the flooring surface, or it may be used in combination with additional mechanical or chemical means for securing the base component to the flooring surface.

Floor mats of the present invention may be of any geometric shape or size as desired for its end-use application. The longitudinal edges of the floor mats may be of the same length and width, thus forming a square shape. Or, the longitudinal edges of the floor mats may have different dimensions such that the width and the length are not the same. Alternatively, the floor mats may be circular, hexagonal, and the like. As one non-limiting example, floor mats of the present invention may be manufactured into any of the current industry standards sizes that include 2 feet by 4 feet, 3 feet by 4 feet, 3 feet by 5 feet, 4 feet by 6 feet, 3 feet by 10 feet, and the like.

The washable floor mat of the present invention may be exposed to post treatment steps. For example, chemical treatments such as stain release, stain block, antimicrobial resistance, bleach resistance, and the like, may be added to the washable mat. Mechanical post treatments may include cutting, shearing, and/or napping the surface of the washable multi-component floor mat.

The performance requirements for commercial matting include a mixture of well documented standards and industry known tests. Tuft Bind of Pile Yarn Floor Coverings (ASTM D1335) is one such performance test referenced by several organizations (e.g. General Services Administration). Achieving tuft bind values greater than 4 pounds is desirable, and greater than 5 pounds even more desirable.

Resistance to Delamination of the Secondary Backing of Pile Yarn Floor Covering (ASTM D3936) is another standard test. Achieving Resistance to Delamination values greater than 2 pounds is desirable, and greater than 2.5 pounds even more desirable.

Pilling and fuzzing resistance for loop pile (ITTS112) is a performance test known to the industry and those practiced in the art. The pilling and fuzzing resistance test is typically a predictor of how quickly the carpet will pill, fuzz and prematurely age over time. The test uses a small roller covered with the hook part of a hook and loop fastener. The hook material is Hook 88 from Velcro of Manchester, NH and the roller weight is 2 pounds. The hook-covered wheel is rolled back and forth on the tufted carpet face with no additional pressure. The carpet is graded against a scale of 1 to 5. A rating of 5 represents no change or new carpet appearance. A rating of less than 3 typically represents unacceptable wear performance.

An additional performance/wear test includes the Hexapod drum tester (ASTM D-5252 or ISO/TR 10361 Hexapod Tumbler). This test is meant to simulate repeated foot traffic over time. It has been correlated that a 12,000 cycle count is equivalent to ten years of normal use. The test is rated on a gray scale of 1 to 5, with a rating after 12,000 cycles of 2.5=moderate, 3.0=heavy, and 3.5=severe. Yet another performance/wear test includes the Radiant Panel Test. Some commercial tiles struggle to achieve a Class I rating, as measured by ASTM E 648-06 (average critical radiant flux>0.45=class I highest rating).

The textile component of the floor mat may be washed or laundered in an industrial, commercial or residential washing machine. Achieving 200 commercial washes on the textile component with no structural failure is preferred.

FIGS. 9A-9F illustrate the installation method for the multi-component floor mat of the present invention. FIG. 9A shows a person ("installer") 901 preparing to install a multi-component floor mat according to the present invention. The installer 901 is shown standing on base component 950 and holding textile component 910. The arrow indicates the direction of force being applied to textile component 910 by installer 901 in order to prepare the components of the floor mat for installation. FIG. 9B is another view of the installation process showing textile component 910 moved closer to alignment with base component 950. FIG. 9C is another view of the installation process showing textile component 910 moved even closer to alignment with base component 950. The installer 901 is holding textile component 910 so that the pile carpet is facing away from base component 950 and the edge attachment means is facing toward base component 950. The installer 901 has aligned one edge of textile component 910 with base component 950. FIG. 9D shows installer 901 lowering textile component 910 onto base component 950. The arrow again indicates the direction of force applied to textile component 910 by installer 901. FIG. 9E shows textile component 910 almost completely lowered onto base component 950 by installer 901. The arrow again indicates the direction of force applied to textile component 910 by installer 901. FIG. 9F shows multi-component floor mat 900 after installation by installer 901. The textile component 910 is properly aligned onto and deployed with base component 950. The installer 901 was able to easily install multi-component floor mat 900 while remaining in the standing position (i.e. feet on the floor; not on his/her hands and/or knees) and without having to adjust and/or re-align textile component 910 with base component 950.

As shown in FIGS. 9A-9F, the person installing the multi-component floor mat simply moves the textile component over the top of the base component, aligning it with left and right alignment marks to achieve horizontal alignment. The textile component is then automatically locked down on the alignment end in near perfect angular and vertical alignment with the base component. Once the alignment end is locked down to the base component, the installer can then assert tension to the textile component by pulling it onto the base component and dropping the textile component onto the near end of the base component using a second set of alignment marks. The result is that the textile component is in near perfect in vertical, horizontal and angular alignment with the base component. The installation of the multi-component floor mat is achieved quickly and by an installer that can remain in the standing position (e.g. feet flat on the floor).

As further illustrated by FIGS. 9A-9F, the installation of the floor mat may include movement of the textile component to the base component by dragging the textile component to the base component. The textile component may be dragged to the base component until the edge attachment means of the textile component (e.g. the loop portion of the edge attachment means) comes into physical contact with the edge attachment means of the base component (e.g. the hook portion of the edge attachment means). In one aspect, the dragging movement may continue until the edge attachment means of the textile component (e.g. the loop portion of the edge attachment means) comes into lateral side-by-side contact with the edge attachment means of the base component (e.g. the hook portion of the edge attachment means).

The following additional alignment and deployment techniques may be used for installing the multi-component floor mat:

In the first case, it has been found that if the top half is rolled up in a fairly tight roll—face in—and then placed down on the base, that the total attraction force is so reduced that an installer can slide the roll enough to be able to get a good alignment with the base using the exposed end of the roll as a guide to align to the base. This method is mainly envisioned for small two part mats. Alignment marks can be put on the base to assist the top alignment.

The second method is to use the first method but coupled with a removable temporary "mask" that reduces the attractive force. This can be accomplished by using film or paper that is placed down on the base between the rolled up top and the base only in the area where the rolled up top will touch. Now that the total area is greatly reduced by the roll AND the force per unit area is reduced by the mask, then the ease of moving the roll around to achieve alignment is now even greater. Once alignment is achieved, the film or paper is slid out.

A third method, that is a refinement of the removable mask method, is to use a mask that is permanently installed and that selectively masks only the most critical area—i.e. the area directly below the roll, and leaves the area near the mat edge alone. For example, if using a magnetic base and iron containing top, one can use a thin magnetically receptive material known as "FlexIron". This material has the ability to significantly reduce the magnetic force while at the same time strongly sticks to the magnetic base and thus will not move; the result is a permanently installed "mask". This mask is sized and positioned so as to only mask the magnetic force directly below the roll, but leaves the edges alone so as to keep the force high where the edges must resist kicking up. One still manually aligns the roll and its edge to the base, but now the alignment is relatively easy and can be done quickly. Additionally, the base component can be selectively magnetized so that a masking section is not magnetized. The perimeter around the masking section, as well as the perimeter that attracts the edge of the top piece, can be selectively magnetized.

A fourth method can be used in concert with any of the above methods or alone. This method relies on an alignment pins or grommets that can capture two or more of the carpet corners. The pins are located in either the base or top and associated with the pins are complementary holes in the top or base. Once inserted, the pins capture the other half of the carpet requiring such that the two halves cannot be separated without substantial force. Once captured, the top mat can be picked up and gently laid down in alignment with the base. If a mat top should become disturbed or misaligned in the field, it is relatively easy to realign by simply picking the top up and laying it back down. If used in concert with 1-3 above, alignment now becomes not only easy, but quick and precise. Furthermore if care is taken to ensure that the masked area is always below the alignment pins and is sufficient size so that if the top is picked up that where it drapes is masked, then alignment/deployment is always easy.

A fifth method is a refinement of number 4 whereby the attachment pins are hidden and not visible from the face of the mat top. Methods to accomplish this are tightly fitting grommets or strong magnets molded into or glued to the back of the top mat, or grommets with strong magnets—all associated with complimentary holes with or without magnets in the base. This method can also be used in association with any of the 1-3 methods.

Another variation includes a line or pattern of magnetic pairs on one end of the textile component that "snap" the textile component and base component together. These pairs can be spaced such that a single alignment is highly favorable over any other attraction. The magnet pairs may be arranged with opposing poles and the different pairs in the line or pattern have alternating spacing to prevent misalignment.

Thus, the multi-component floor mat of the present invention provides many advantages over the prior art. The textile component is easily deployed/installed with the base component by dragging the textile component over the base component until the alignment mechanisms are contacted and secured in place. Also, the textile component is easily picked up/uninstalled from the base component by a field service person (e.g. installer) by lifting up the edge or corner of the textile component and removing it from the base component. The textile component of the multi-component floor mat can be made with a rubber edge around its perimeter so that it is similar in appearance to a traditional one-piece mat. The rubber edge perimeter also can be used to prevent metal pieces from being attracted to the sides of the base and/or textile components which contain a magnetic coating.

EXAMPLES

The invention may be further understood by reference to the following examples which are not to be construed as limiting the scope of the present invention.
Several Variables were Tested:
Test Procedures
Commercial Wash Procedure:
1. 140 degree Fahrenheit wash for 10 minutes.
2. 3 rinses, 140 degrees, 3 minutes each.
3. 2 rinses, 90 degrees, 3 minutes each.
4. 2 minutes low extraction.
5. 10 minutes high extraction.

Some samples were evaluated on a "pass" or "fail" basis. A "pass" rating indicates that the textile component did not fall apart, but rather maintained its structural integrity and was suitable for use in its intended purpose. A "fail" rating indicates that one or more layers of the textile component came apart, that the textile did not maintain its structural integrity, and/or the textile was not suitable for use in its intended purpose.
Torture Wash:
1. 190 degree Fahrenheit wash for 30 minutes.
2. 2 rinses, 90 degrees, 3 minutes each.
3. 2 minutes low extraction.
4. 10 minutes high extraction.

A Torture Wash is intended to be equivalent to 10 commercial washes.
Lateral Movement Test:

The amount of movement in a floor mat is measured using the lateral movement test. First a location on the floor is marked usually using a piece of tape. Next a floor mat is placed at that mark. For a lateral movement walk test, the person conducting the test walks over the test piece 150 times. Each pass must be in the same direction to ensure accurate measurement movement. Once this is done 150 times in the same direction, the person conducting the test must measure how far the test piece is from the original location. This should be done on both of the front corners. Once a walk test is completed, a second Lateral Movement Cart Test is run. This test involves the same process, but requires a cart holding a 100 lb. load to roll over the test piece 50 times. The distance is then measured and recorded.
Thickness Determination:

The thickness of each sample was measured using a Starrett pocket dial gauge. The specific model was the Starrett No. 1010. The pocket dial that was used came with an inspection certificate (Form 804) to ensure accuracy.
Tuft Lock Test:

The tuft lock test was conducted by cutting out a sample of finished textile component approximately 6"×10". Once the sample was cut out, it was placed in a TensiTech tensile testing machine. A tensile testing program was then run allowing the machine to grasp on to a single tuft in the carpet. Once the machine locked on to a single tuft, it recorded how much force was required to pull the tuft out of the rubber backed textile component. This data was then recorded and run 4 more times for a total of 5 pulls. Then, once all tests were complete the data was evaluated making sure all pulls recorded a value higher than 4.0 lbf.
Body Tear Test:

The body tear test was conducted by cutting out a sample of finished textile component approximately 4"×7" with a 2" slit at one end of it. Once the sample was cut out, it was placed in a TensiTech tensile testing machine with one side of the slit in the top clamp, and the other side of the slit in the bottom clamp. A tensile testing program was then run pulling the top clamp upwards. The force required to pull the top clamp up was recorded as the sample ripped in half. This data was then recorded and run 2 more times for a total of 3 pulls. Then, once all tests were complete the data was evaluated making sure all pulls recorded a value higher than 13.0 lbf.

The magnetic hold strength test was conducted by cutting out a 8"×8" sample of finished textile component with smooth magnetically responsive backing. Once the sample was cut out, it was clamped in the top clamp of the Instron tensile testing machine such that the full width of the mat was in the 9 inch wide top clamp to a length of at least 1" inch. A 6"×2" magnetic strip with a magnetic strength of 200 gauss was mounted on a stiff metal plate measuring 10"×8" with the long side oriented in the vertical direction. The metal plate was mounted in an immobile fixture on the base of the machine and aligned parallel to the textile component in such a manner that the magnetic strip was in intimate contact with the magnetically responsive backing of the finished textile component. A testing program was then run pulling the top clamp upwards. The force required to pull the top clamp up was recorded as the sample traversed across the length of the magnetic strip. This data was then recorded and run 2 more times for a total of 3 pulls. Then once all tests were complete the data was evaluated at 0.1" traverse to assess the magnetic hold strength in lbf/inch.

Example 1: In this example, the textile component of the floor mat was approximately 3' wide by 5' long and the base component was roughly 4" shorter in both the width and the length, giving a 2" overlap of the textile component on each side and hiding the base component. The underside of the textile component and the top of the base component were smooth with no protrusions, and the textile component was deployed in a sweeping motion keeping the contact area of the textile component to the base component small until the textile component was mostly over the top of the base component. The textile component was then dropped down on the base component. Because the textile component was substantially oversized compared to the base component, the alignment of the textile component was not critical and the result was that the base component was hidden underneath the textile component. The presence of the base component kept the textile component from undesirable movement during use.

Example 2: In this example, the floor mat of Example 1 was altered so that there was a hook strip of Velcro on the short edge of the base component and a matching strip of loop Velcro on the underside of the textile component. These two strips were positioned so that they were in alignment when the textile component was in alignment with the base component. As the textile component was dragged onto the base component, as in Example 1 above, the two strips of Velcro made physical contact and locked into/onto one another, thus stopping the movement of the textile component and ensuring the forward to back alignment of the components was correct.

Example 3: In this example, the Velcro of Example 2 was replaced with a rubber ridge approximately ⅛" high extending along the short edge of the textile component and molded into the underside of the textile component; it was positioned in the same place as the Velcro in Example 2. The Velcro on the base component of Example 2 was eliminated, and the rubber ridge of the textile component engaged the edge of the base component so as to provide the same alignment capability of Example 2.

Example 4: This example was the same as Example 2, except that the Velcro strips were replaced with a mushroom type engaging fastener such as 3M Dual Lock.

Evaluation of Backing Material

Example A—Mat with Nitrile Rubber Backing

A mat was prepared as follows:

A tufted face assembly was prepared comprising a nylon 6,6 yarn tufted into a pre-shrunk Lutrador 52 nonwoven primary backing. The nylon 6,6 yarn was $\frac{1}{8}^{th}$ inch gauge and was tufted at 8.70 stiches per inch. Tufts were sheared to a pile height of $\frac{18}{64}^{th}$ inch, resulting in a fabric weight of 20.0 oz/sq. yard. The tufted roll measured 145 inches from outside tuft row to outside tuft row.

The tufted roll was then printed using a Millitron® digital printing machine. The tufted face assembly was run down the Millitron® digital printing machine at a speed of 25 feet/minute. A combination of 12 gun bars was utilized to distribute dye to the tufted face assembly with the dye flow set to 36. The tufted face assembly was then exposed to a first steam step in a steamer at 209° F., and then again in a post steam/stain blocker step at 150° F. The printed tufted face assembly was then dried at 240° F.

The printed tufted face assembly was then slit into 3.2' wide rolls. These rolls were placed on top of 0.130" (thickness) nitrile rubber. The uncured nitrile rubber was then sent into a press with the printed tufted face assembly on top. The press heated up to 365° F. from the bottom as soon as the printed assembly entered the press area. The press then applied pressure at 35 psi to the top of the printed tufted face assembly to push it into the rubber. The printed tufted face assembly was then held in the press for 8 minutes before it was removed. After it was removed, it was preshrunk in a drier at 290° F. to form a washable carpet in roll form. The washable carpet in roll form was then cut into the desired shape and/or size.

In another example, a mat was made with a 0.030" thick magnetically responsive filler loaded nitrile rubber backing. The mat had solution dyed yarn (SDN) yarn tufted in a polyester non-woven primary backing layer. It was bonded to the backing at 370° F. under 35 psi pressure and cured for 4 minutes. No further preshrinking was done. However, the backing layer was then exposed to a needling process to make it porous.

Evaluation of Backing Style

Smooth Nitrile Backed Mat

A smooth rubber backing has no protrusions on the rubber surface of the mat (e.g. the surface of the mat that comes in contact with the magnetic base). In other words, the smooth backing is free from protrusions. Protrusions are typically added to the magnetic base to aid in preventing unintended lateral movement of the mat.

The construction of the washable mat was identical to the mat produced in Example A. When the nitrile rubber was placed on the press, it was put on a Teflon coated belt that had no indentions in it. The top of the belt was smooth which allowed the bottom of the rubber to have a smooth surface as well.

Gripper (Standard Cleat) Nitrile Backing for Magnetic Base Component

The nitrile rubber for the base was constructed by layering of the magnetic rubber and the rubber without any magnetic fillers with the latter one forming the gripper base. A gripper rubber backing was characterized by having (1) a grid pattern on the rubber surface that was free from protrusions and (2) protrusions on the interior spaces between the protrusion free areas. The protrusions were present in a square pattern. Thus, the gripper backing contained a repeating pattern of small protrusions in areas that were $\frac{7}{8}^{ths}$ inch by 1 inch square. The protrusions were approximately $\frac{1}{16}^{th}$ inch high. The protrusions covered approximately 70 percent of the surface of the rubber backing.

The construction of the washable mat was the same as the mat produced in Example A. When the nitrile rubber was placed on the press, it was put on a Teflon coated belt that had $\frac{1}{16}^{th}$ inch indention in it in small square patterns. When the press reached 365° F., it caused the rubber to become very soft. Once the pressure of 35 psi was applied to the top of the washable mat assembly, it pushed the soft rubber into the indentions forming the "gripper" pattern.

Megahold Nitrile Backing for Magnetic Base Component

The nitrile rubber for the base was constructed by layering of the magnetic rubber and the rubber without any magnetic fillers with the latter one forming the megahold base. A megahold rubber backing was characterized by having fewer and larger indentations on the rubber surface, when compared to the gripper backing. The indentations were present in groups of four that and were spaced in a square pattern. Thus, the megahold pattern contained a repeating pattern of four large indentations in areas that were 3.625 inches by 3.875 inches square. The indentations were approximately ⅛ inch deep. The indentations covered approximately 40 percent of the surface of the rubber backing.

The construction of the washable mat was the same as the mat produced in Example A. Before the rubber was placed on to the Teflon belt, the operator placed a metal plate on the belt. The metal plate contained circles on the top surface. The circles included a hole drilled in the center to allow rubber to form on the inside. The nitrile rubber was then placed on top of the metal plate, with the fabric/carpet on top. When the press reached 365° F., it caused the rubber to become very soft. Once the pressure of 35 psi was applied to the top of the washable mat assembly, it pushed the soft rubber around and into the metal plate forming the "Megahold" backing.

Evaluation of Magnetic Coating Thickness on Textile Component

The magnetic backcoating layer thickness was varied. Samples were prepared with 20 mils, 25 mils and 30 mils of magnetic backcoating. The backcoatings were applied to Forever® mats from Milliken & Company of Spartanburg, SC. These mats were then subject to the standard wash and body tear test and a magnetic shear hold test.

To perform the magnetic shear hold test a test set-up was created where the bottom grip of an Instron was replaced by a vertical aluminum plate with a permanent magnet sheet attached. The permanent magnetic sheet was similar in construction and in magnetic strength (measured in Gauss) to the magnetic base component that the magnetic backcoated textile component was installed on. The magnetic backcoated textile component was gripped on the top jaw of the test frame such that the magnetic backcoating was attached to the permanent magnet sheet. The assembly was adjusted to ensure that the backcoated textile component moved parallel to the face of the magnetic sheet on the aluminum plate when the top jaw was moved at a rate of 12 inches/minute. The force on the load cell after a 1" traverse was recorded as the magnetic shear force.

The results from testing the backcoated textile at 1×, 10× and 20× torture washes is presented in Table 1 below.

plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

TABLE 1

Evaluation of Magnetic Coating Thickness on Textile Component After Washing

| Mat | Units | Control mat – 53 mil 1X | Coating Thickness 30 mil 1X | | 20X | Coating Thickness 25 mil 1X | 10X | 20X | Coating Thickness 20 mil 1X | 10X | 20X |
|---|---|---|---|---|---|---|---|---|---|---|---|
| | | | | 10X | | | | | | | |
| Trouser tear force | lb | 32.6 | 23.2 | 23.9 | 23.9 | 20.7 | 24.2 | 23.7 | 20.9 | 23.5 | 21.9 |
| Tuft Lock force | lb | 4.9 | 4.9 | 5.0 | 4.2 | 5.2 | 4.9 | 4.8 | 4.5 | 4.2 | 3.6 |
| Magnetic Hold (Shear) | gf | — | 450.5 | 350.0 | 539.0 | 359.0 | 160.0 | 184.0 | 370.5 | 94.0 | 103.5 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the

We claim:

1. A process for cleaning a multi-component floor mat, said process comprising the steps of:
   (a) Providing a multi-component floor mat comprising:
      (i) A textile component comprising (i) a first layer of tufted pile carpet formed by tufting face yarns through a primary backing layer and (ii) a second layer of vulcanized rubber material that contains magnetic particles and that is of the same length and width as the first layer; wherein the textile component is free from a continuous, three-dimensional border; and (ii) A base component comprising an elastomer that contains magnetic particles;

wherein the textile component and the base component are releasably attachable to one another via magnetic attraction; and wherein each layer of the textile component is at least 10% larger in length and width than the base component;

(b) Removing the textile component from the base component;

(c) Laundering the textile component in an industrial, commercial, or residential washing machine; and (d) Re-installing the textile component on the base component.

\* \* \* \* \*